US009329594B2

(12) United States Patent
Rataul

(10) Patent No.: US 9,329,594 B2
(45) Date of Patent: May 3, 2016

(54) VERIFICATION METHODS AND SYSTEMS FOR USE IN COMPUTER DIRECTED ASSEMBLY AND MANUFACTURE

(75) Inventor: Balbir S. Rataul, Morgan Hill, CA (US)

(73) Assignee: Paramit Corporation, Morgan Hill, CA (US)

( * ) Notice: Subject to any disclaimer, the term of this patent is extended or adjusted under 35 U.S.C. 154(b) by 803 days.

(21) Appl. No.: 13/490,393

(22) Filed: Jun. 6, 2012

(65) Prior Publication Data

US 2013/0144416 A1   Jun. 6, 2013

Related U.S. Application Data

(60) Provisional application No. 61/493,958, filed on Jun. 6, 2011.

(51) Int. Cl.
    *G06F 19/00*    (2011.01)
    *G05B 19/418*   (2006.01)

(52) U.S. Cl.
    CPC .... *G05B 19/41865* (2013.01); *G05B 19/41805* (2013.01); *G05B 2219/24168* (2013.01); *G05B 2219/31053* (2013.01)

(58) Field of Classification Search
    CPC ..... G06Q 10/06; G06Q 30/018; G06Q 10/20; H04L 67/22; G05B 19/4183; G05B 2219/31027; G05B 2219/31044; G05B 2219/31048; G05B 2219/37078; G05B 2219/37208; G05B 2219/37574
    See application file for complete search history.

(56) References Cited

U.S. PATENT DOCUMENTS

| | | | | |
|---|---|---|---|---|
| 5,134,560 A * | 7/1992 | Ferriter et al. | | 700/83 |
| 6,224,385 B1 * | 5/2001 | Nitta et al. | | 434/219 |
| 6,266,635 B1 * | 7/2001 | Sneh | | 704/235 |
| 6,499,016 B1 * | 12/2002 | Anderson | | 704/275 |
| 7,240,010 B2 * | 7/2007 | Papadimitriou et al. | | 704/275 |
| 7,937,176 B2 * | 5/2011 | Knipfer et al. | | 700/99 |
| 8,417,364 B2 * | 4/2013 | Seaman et al. | | 700/95 |
| 8,668,793 B2 * | 3/2014 | Engelbart et al. | | 156/64 |
| 2002/0122583 A1 * | 9/2002 | Thompson | | 382/141 |
| 2003/0163917 A1 * | 9/2003 | Davidshofer et al. | | 29/854 |
| 2004/0183900 A1 * | 9/2004 | Karpen et al. | | 348/92 |
| 2004/0201602 A1 * | 10/2004 | Mody et al. | | 345/700 |
| 2004/0225390 A1 * | 11/2004 | Keller et al. | | 700/95 |
| 2005/0273626 A1 * | 12/2005 | Pearson et al. | | 713/186 |
| 2006/0069462 A1 * | 3/2006 | Cannedy et al. | | 700/180 |
| 2008/0075351 A1 * | 3/2008 | Smith | | 382/141 |
| 2009/0098920 A1 * | 4/2009 | Toompere | | 463/16 |

(Continued)

*Primary Examiner* — Darrin Dunn
(74) *Attorney, Agent, or Firm* — Leland Wiesner; Wiesner and Associates

(57) ABSTRACT

Verification methods, systems, and computer program products verify the completion of assembly instructions used in light-manufacturing. Using position guides in a user interface, an in-use component is aligned and ready for verification through a first set of images of the in-use component. A visual highlight area on the user interface overlaying the in-use component indicates where to perform the assembly instructions. To create a traceable record, a second set of images are stored in an assembly record database when the assembler points a wand where the in-use component has been assembled. Another verification approach includes pointing an image capture device over the in-use component and receiving a first voice command authorizing image acquisition. A second voice command confirms accuracy of the image and proper assembly. Storing first and second voice commands and images of the in-use component being assembled in an assembly record database creates another traceable record useful for verification.

14 Claims, 15 Drawing Sheets

(56) References Cited

U.S. PATENT DOCUMENTS

| | | | |
|---|---|---|---|
| 2009/0162043 A1* | 6/2009 | Chou | 396/56 |
| 2010/0153072 A1* | 6/2010 | Takeda | 703/1 |
| 2010/0153168 A1* | 6/2010 | York et al. | 705/9 |
| 2010/0325544 A1* | 12/2010 | Alhadeff et al. | 715/716 |
| 2011/0050888 A1* | 3/2011 | Shibukawa et al. | 348/135 |
| 2011/0069895 A1* | 3/2011 | Ueno et al. | 382/218 |
| 2012/0130521 A1* | 5/2012 | Kohlhoff | 700/98 |
| 2013/0120439 A1* | 5/2013 | Harris et al. | 345/619 |
| 2014/0350708 A1* | 11/2014 | Kobayashi | 700/108 |

* cited by examiner

VERIFICATION METHODS AND SYSTEMS FOR USE IN COMPUTER DIRECTED ASSEMBLY AND MANUFACTURE

(1) CROSS-REFERENCE TO RELATED APPLICATIONS

The subject matter of this patent specification claims priority and relates to the subject matter of U.S. Provisional Application Ser. No. 61/493,958 filed Jun. 6, 2011, entitled, "MANUFACTURING VERIFICATION METHOD AND SYSTEM" by Balbir S. RATAUL, assigned to the assignee of the present invention and incorporated by reference herein for all purposes. The subject matter of this patent specification further relates to the subject matter of the following commonly assigned applications being filed on the same day as the present application: (1) U.S. Ser. No. 13/490,388 entitled, "COMPUTER DIRECTED ASSEMBLY METHOD AND SYSTEM FOR MANUFACTURING"; (2) U.S. Ser. No. 13/490,393 entitled, "VERIFICATION METHODS AND SYSTEMS FOR USE IN COMPUTER DIRECTED ASSEMBLY AND MANUFACTURE"; (3) U.S. Ser. No. 13/490,397 entitled, "SYSTEM AND METHOD FOR MANAGING TOOL CALIBRATION IN COMPUTER DIRECTED ASSEMBLY AND MANUFACTURING"; (4) U.S. Ser. No. 13/490,399 entitled, "INTERFACE METHOD AND SYSTEM FOR USE WITH COMPUTER DIRECTED ASSEMBLY AND MANUFACTURING"; (5) U.S. Ser. No. 13/490,397 entitled, "TRAINING ENSURANCE METHOD AND SYSTEM FOR COMPUTER DIRECTED ASSEMBLY AND MANUFACTURING"; (6) U.S. Ser. No. 13/490,406 entitled, "RESOURCE SCHEDULING METHOD AND SYSTEM FOR USE WITH COMPUTER DIRECTED ASSEMBLY AND MANUFACTURE". Each of the above-referenced patent applications is incorporated by reference herein for all purposes.

(2) TECHNICAL FIELD

The subject matter described herein relates to systems and methods used in a manufacturing process. More particularly, the subject matter described herein relates to methods and systems for using computers and multimedia information to verify the proper assembly of manufactured products.

(3) DESCRIPTION OF THE RELATED ART

A great deal of modern devices and equipment continue to be manufactured using manual assembly. Increasingly, complex mechanical, electrical, and electro-mechanical designs having relatively small dimensions require skilled and trained assemblers to perform a variety of assembly tasks, some done directly with their hands or with the assistance of a variety of precision hand tools. This type of manufacturing is often deemed light manufacturing as it involves applying a certain degree of human skill and know-how to combine fasteners, connectors, and other materials in the creation of the final manufactured product. Light manufacturing and manual assembly are also often preferred for smaller production runs when costs associated with automation and retooling cannot be amortized over the production run time frame while maintaining profit margins.

To help reduce human error and other mistakes, conventional light manufacturing methods incorporate a "Manufacturing Process Instruction" (MPI) document in either a hardcopy form or displayed on a computer monitor that each assembler refers to during the assembly process. The MPI may be created by a manufacturer to provide specific instructions for the assembly of a wide-range of products from computers, household electronics, communication equipment, or even sophisticated medical equipment. In each of these categories, the quality and consistency of the final product produced depends on whether the person involved with assembling an assembly or subassemblies actually understands and accurately follows the instructions within the MPI.

Since the MPI does not actually control the act of assembling products, product quality may be inconsistent or lower than desired. An assembler may initially follow every step of the MPI document to produce high quality products but later deviate from the MPI instructions and produce products with defects or other problems. In another scenario, an assembler may follow his own assembly sequence and, as needed, flip through the MPI document as an occasional reference. Products assembled in this latter approach may be of consistent but overall lower quality if the approach taken by the assembler consistently skips steps or takes unacceptable shortcuts.

The lack of controls and accountability associated with the MPI document also makes it difficult to track down and find the source of a problem. This is especially true if there are many sub-assemblies or components that makeup the overall manufactured products. Indeed, checklists may be used in conjunction with the MPI document to query the assembler and verify whether instructions in the MPI document were taken. Once again, the assembler may not answer or inaccurately answer questions in the checklist thus circumnavigating the quality control checkpoints provided.

SUMMARY

Aspects of the disclosure provide methods, systems, and computer program products for verification of computer-implemented assembly instructions used when an assembler creates a manufactured product. Generally, a product designer or engineer develops a product and then creates the assembly instructions in accordance with embodiments to assemble the product. Assemblers use these assembly instructions to guide the manual assembly of materials, components and other parts into the final product. Typically, the assembler executes these assembly instructions on a specially equipped computer directed assembly (CDA) workstation described herein to ensure the products are produced both quickly and with the highest quality. Verification steps incorporated into these assembly instructions create a traceable and reliable record to both ensure the assembly instructions were performed properly and for troubleshooting products that may not be working properly.

Method, systems, and computer program products of the disclosure verify the completion of a sequence of one or more assembly instructions using a wand for identifying a component being assembled and an image capture device for acquiring video and image. Initially, in one embodiment, position guides are displayed in a user interface for aligning an in-use component being assembled in accordance with assembly instructions used on the in-use component associated with the manufactured product. Using the position guides, in some embodiments, a first set of one or more images of the in-use component is processed to determine when the in-use component has been positioned in a predetermined position relative to the position guides displayed by the user interface. Next, the user interface displays an image of the in-use component being assembled with a visual highlight area that overlays a portion of the in-use component where the assembler is to perform the assembly instructions. In many cases, the assembler will use the visual highlight area as a guide for attaching one or more materials to the in-use component. Once the assembly instructions have been completed, in some embodiments, a second set of one or more images of the in-use component being assembled is processed to locate a tip of a wand being held by an assembler over a portion of the component that the assembler indicates has been worked upon. Images of the in-use component are stored along with data in an assembly record database creating a traceable record of the materials used and the assembly operation performed.

In other embodiments, a verification method, system, and computer program product verify the completion of a sequence of one or more assembly instructions using voice commands and an image capture device. Verification embodiments position an image capture device over a portion of an in-use component that received materials as a result of an assembler completing one or more assembly instructions displayed on a user interface. For example, the assembler may point a lightweight camera at the area of the component where the assembly instructions are performed. Next, the verification embodiment processes a first voice command from the assembler authorizing acquisition of an image from the image capture device positioned over the portion of in-use component. The first voice command causes the camera to acquire an image that the assembler can review on the user interface. If the image taken is acceptable, in some embodiments, a second voice command from the assembler is processed confirming accuracy of the image acquired and that the in-use component has been properly assembled. To create a traceable record of the materials used, the assembly operation performed, and an assembler's verbal participation, in other embodiments the first and second voice commands from the assembler and images of the in-use component being assembled are stored in an assembly record database.

DETAILED DESCRIPTION

Figure 1:
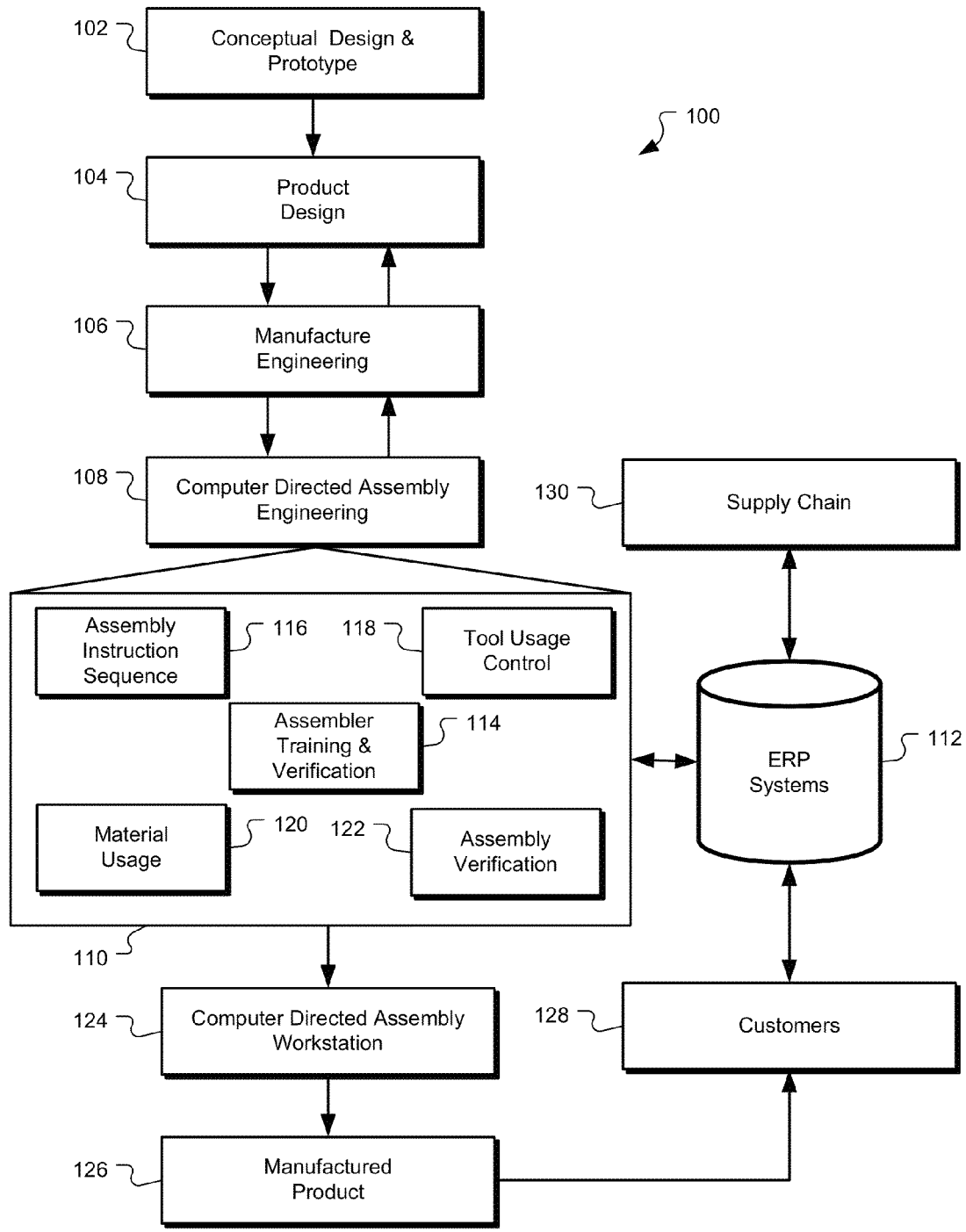
FIG. 1 is a high level block diagram illustrating an exemplary development process of taking a product from conceptual design to manufacture in accordance with some embodiments.

In the following detailed description, for purposes of explanation, numerous specific details are set forth to provide a thorough understanding of the various embodiments of the disclosure. Those of ordinary skill in the art will realize that these various embodiments are illustrative only and are not intended to be limiting in any way. Other embodiments will readily suggest themselves to such skilled persons having the benefit of this disclosure.

In addition, for clarity purposes, not all of the routine features of the embodiments described herein are shown or described. One of ordinary skill in the art would readily appreciate that in the development of any such actual implementation, numerous implementation-specific decisions may be required to achieve specific design objectives. These design objectives will vary from one implementation to another and from one developer to another. Moreover, it will be appreciated that such a development effort might be complex and time-consuming but would nevertheless be a routine engineering undertaking for those of ordinary skill in the art having the benefit of this disclosure.

A computer directed assembly method and system designed in accordance with embodiments offers many advantages and benefits, some of these advantages include one or more of the following. Generating the assembly operations for assembling a component may be tailored to the address specific assembly requirements in each particular design. If an assembly is complex with strict tolerances, the designer or manufacturing engineer may decide to incorporate more discrete assembly operations or steps to ensure the assembly is put together correctly and completely. The assembly operations may incorporate different types of multimedia content including images, videos, text, and audio to convey the specific steps necessary to complete an operation accurately and efficiently.

Embodiments described herein maintain control over the assembly process and ensure each step of the assembly is performed in sequence. Assembly operations for a component are presented in order and recorded as both a history of the component being assembled and the task performed by the assembler. Recording the assembly operations serves to create a permanent record while encouraging the assembler to follow the assembly routine. To confirm that a component is being assembled according to plan, some embodiments include verification steps that record images, video, audio, and/or other multimedia data of the component as the component is assembled. In some embodiments, the multimedia data creates a permanent record and a traceable sequence of events available if the assembly record needs later review. In other embodiments, verification steps may further include comparing a predetermined image of a previously assembled component with an image taken of an "in-use" component being assembled. Embodiments may alternatively use image processing routines to perform an immediate and direct comparison between a predetermined image of an assembly and the in-use image of a part or other component "in-use" and being assembled.

FIG. 1 is a high level block diagram illustrating an exemplary development process for a manufactured product from conceptual design to manufacture in accordance with some embodiments. This development process illustrated in FIG. 1 provides one exemplary developmental process where the computer directed assembly processing designed in accordance with some embodiments can be used. Other development processes may also be used in other embodiments as well. For example, these other development processes may include greater or fewer steps than illustrated in FIG. 1 or may combine several of the steps in FIG. 1 together or may expand certain steps in FIG. 1 into additional substeps.

Referring to FIG. 1, the development process for a product generally starts with a conceptual design and prototype 102. In the earliest stage of product development, a person or team of people have an idea and decide if the idea can be turned into a product. Next, sketches of the product are either drawn by hand or using computer aided design (CAD) or similar tools. The design may be tested using simulation tools to quickly determine if the product will produce a desired result under one or a variety of "what if" scenarios. If the conceptual design and testing is viable, an actual prototype of the product may be put together using readily available components and manual assembly techniques. Since only one or several prototypes of a product are made, cost and volume production considerations are not generally the highest concern.

During product design 104, the prototype of a product may change to accommodate both design and production or requirements. Some design requirements affecting product design 104 may include aesthetic changes in the shape of the product, a reduced form factor to make the product fit into a smaller or thinner package for production. As part of product design 104, availability and costs for components and materials, as well as the total costs associated with assembling and shipping the finished product should also be considered. In some embodiments, manufacture engineering 106 provides feedback to product designers concerning the costs of materials and creation of the product as proposed in product design 104. In some embodiments, manufacture engineering 106 works iteratively with product design 104 refining the details and influencing the direction of the final product to be produced from product design 104. For example, people involved with manufacturing engineering 106 may find that the materials specified to create the components for the product are too expensive or the logistics associated with acquiring the materials for the product will not meet the projected demand.

Computer directed assembly (CDA) engineering 108, in accordance with some embodiments, incorporates numerous innovative manufacturing methods and systems in the manufacture of products while meeting and meet numerous constraints. In some embodiments, CDA engineering 108 includes multiple disciplines from industrial engineering, human factors, computer science, tooling and other areas to improve light-assembly of products with increased efficiencies, including an assembly instruction sequence 116, tool usage control 118, material usage 120, assembly verification 122, and assembler training and verification 114.

In some embodiments, CDA engineering 108 creates an assembly instruction sequence 116 tailored to the specific assembly of each product. The assembly instruction sequence 116 ensures each product is assembled properly by providing an assembler a step-by-step sequence of tasks to perform. To make sure the assembler understands how to perform each assembly instruction, the computer directed assembly workstation 124 processing the assembly instruction sequence 116 may present one or more types of multimedia data including text, images, video, and audio. For example, a user interface running on the computer directed assembly workstation 124 may present text statements describing the task to be performed while corresponding images or videos may illustrate the task previously performed by a trained assembler.

In the area of material usage 120, CDA engineering 108 specifies the location of materials in one or more pockets within a matrix tray. Pockets of each matrix tray are filled in advance with the specific materials to be used later by the assembler during the assembly process. Specific predetermined images of the matrix tray and the location of materials in each pocket of the tray are specifically referenced by steps in assembly instruction sequence 116. This approach reduces wasted materials as all the materials in the trays should be used as specified in assembly instruction sequence 116. Leftover materials or missing materials generally may mean that the assembly was not performed correctly or certain materials were misplaced or lost.

CDA engineering 108 also includes tool usage and control 118 to make sure the proper tools are used and the assembly is completed according to specified tolerances. Tool usage control 118 incorporated in assembly instruction sequence 116 selects tools for the assembler, and the use of the tool and torque to apply upon a fastener may also be described and/or illustrated through computer directed assembly workstation 124. In accordance with some embodiments, computer directed assembly workstation 124 may also use tool usage control 118 combined with sensors embedded in the tools as a basis for determining if the tools need to be replaced or recalibrated. Power tools not replaced or calibrated as specified in tool usage control 118 cannot be used for further assembly tasks on computer directed assembly workstation 124.

Assembly training and verification 114 is another novel component of CDA engineering 108 in accordance with some embodiments. As new products and corresponding assembly methods are created, assemblers must make sure they are trained and capable of performing the assembly tasks both efficiently and accurately. CDA engineering 108 incorporates assembly training and verification 114 as part of a database associating each assembler's skills with specific assembly tasks used to manufacture certain products. A manufacture engineer uses assembly training and verification 114 within CDA engineering 108 to define a prerequisite training for each step in the assembly training sequence 116. The prerequisite training is required before an assembler is allowed to perform one or several tasks in the assembly of the product. In accordance with assembly instruction sequence 116, an assembler lacking proper training indicated by database records in Enterprise Resource Planning (ERP) systems 112 are deemed to lack the proper training and skill and cannot continue with an assembly.

As a further control on quality, assembly verification 122 checks on the accuracy of tasks performed from assembly instruction sequence 116 in accordance with some embodiments. The manufacture engineer may incorporate assembly verification 122 through CDA engineering 108 for some or all tasks performed by the assembler; more verification generally improves the quality but may increase the time to assemble a product. In some embodiments, assembly verification 122 executes software instructions on the computer directed assembly workstation 124 instructing the assembler to identify where a material has been attached to a product or component and then take a photo or video of the result. Generally assembly verification 122 encourages an assembler to work more accurately as videos, images, and/or other records of assembling the product are kept as a permanent record of the assembler's work history and stored in ERP systems 112 or elsewhere.

Once a product has been assembled into a manufactured product 126, manufactured product 126 is delivered to customers 128 through normal delivery and shipping channels. In accordance with some embodiments, ERP systems 112 are enhanced with additional details on the assembly of each product through methods and systems associated with CDA engineering 108. In some embodiments, records and billing associated with supply chain 130 are updated to reflect the materials used in the manufacture of a product. Specific materials taken from the supply chain 130 may also be identified, including details such as serial numbers and data of manufacture, and stored as part of the assembly records in ERP systems 112. Accordingly, ERP systems 112 and other databases enhanced in accordance with the various embodiments are of particular value to industries requiring high quality products with detailed records and traceability to specific materials and their assembly into products. For example, detailed information tracking materials and their assembly is useful in medical, military, space, aeronautical, and other industries using products that impact health and/or safety.

Figure 2:
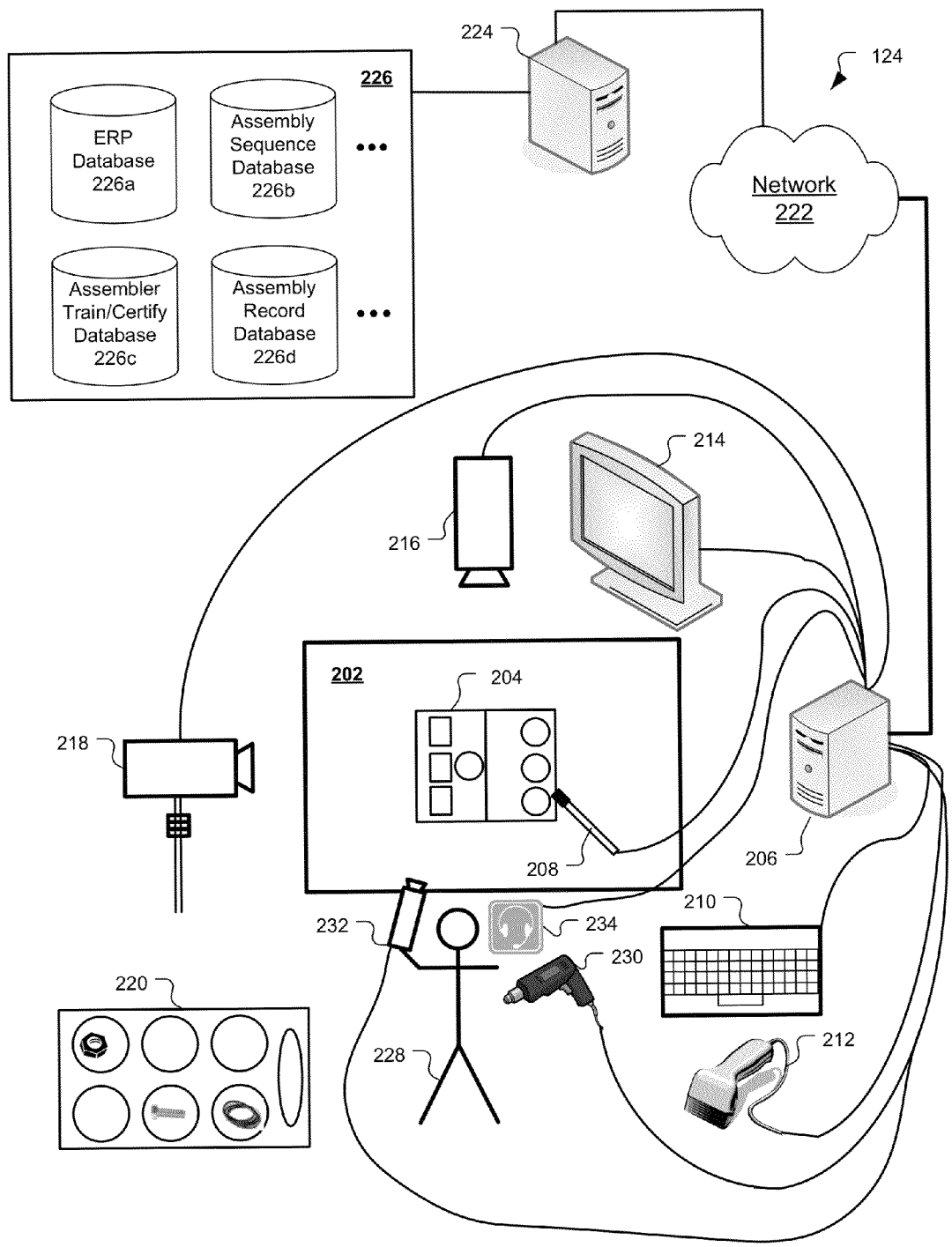
FIG. 2 is a schematic block diagram illustrating an exemplary computer directed assembly workstation for building and verifying assemblies in accordance with some embodiments.

Referring to FIG. 2, a schematic block diagram illustrates an exemplary computer directed assembly workstation 124 for building and verifying assemblies in accordance with some embodiments. Computer directed assembly workstation 124 is the same as referenced in FIG. 1 except FIG. 2 provides additional details of one configuration consistent with one embodiment. Accordingly, in some embodiments workstation 124 includes a workbench 202, an in-use component 204 being assembled into a product, a computer device 206, a wand 208, a keyboard 210, a scanner device 212, a display device 214, a first camera 216, a second camera 218, a headset 234, a third camera 232, a matrix tray 220 for holding materials, a network 222 such as the Internet or an intranet, and a network accessible server 224 with databases 226 including ERP databases. Computer directed assembly (CDA) software (not shown) in accordance with embodiments executes, on computer device 206 orchestrating the interaction between the assembler and the aforementioned peripherals while assembling in-use component 204 into a product. While some embodiments as illustrated in FIG. 2 use wired connections between computer device 206 and peripherals such as wand 208, keyboard 210, scanner device 212, display device 214, first camera 216, and second camera 218, third camera 232, headset 234 other embodiments may use wireless connections between one or more of these aforementioned peripherals and computer device 206 as they can be positioned more easily around workbench 202 and less likely to interfere with the overall working area used for assembly.

Workbench 202 provides a surface or area that an assembler 228 uses when performing assembly related tasks in conjunction with in-use component 204. In some embodiments, assembler 228 may place in-use component 204 directly upon workbench 202 especially if the in-use component is relatively small, lightweight, or both. In alternative embodiments, assembler 228 may place in-use component 204 next to or adjacent to workbench 202 especially if the in-use component being worked upon or final product is larger, oversized, and/or too heavy for the workbench 202.

Assembler 228 may use a number of different tools or data gathering peripherals connected to computer device 206 when operating a workstation 124 in accordance with some embodiments. In one embodiment, assembler 228 may move wand 208 over one or more areas of in-use component 204 to identify the area of the component being assembled or receiving various materials. In some embodiments, wand 208 may be approximately ½ inch in diameter and 12 to 14 inches in length and have an identifiable colored tip. Wand 208 may be equipped with different colored light emitting diodes (LEDs) and operatively coupled to receive signals and power from computer device 206 that drive the brightness and colors emitted from the LEDs. Further embodiments of wand 208 with LEDs may be battery powered with rechargeable batteries and wirelessly controlled from computer device 206 using Bluetooth, WiFi, or other suitable technology. Alternatively, the color of the tip of wand 208 may be painted, dyed, or set using different colored caps and function without power or control signals and thus not required to be connected with computer device 206.

As assembler 228 moves wand 208, CDA software may cause first camera 216 and second camera 218 to take one or more images or videos of the position of wand 208 relative to in-use component 204. First camera 216 and second camera 218 are positioned to capture images along different axes of the plane of workbench 202 however additional cameras may take overhead images looking down on workbench or from other perspectives of workbench 202. Third camera 232 may be a handheld, lightweight, wired or wireless device that assembler 228 can position as needed to take images of in-use component 204 being worked upon. These cameras may be industrial or consumer grade cameras with motorized lens having motorized zoom and motorized iris components in their lens and controlled through a lens controller (not shown) driving by computer device 206. Taking images from cameras at multiple view points gives a better understanding of how the assembly took place. This is useful to later verify whether an assembly was done correctly or incorrectly. In some embodiments, assembler 228 positions wand 208 in response to one or more assembly instructions from CDA software on workstation 124 requesting the assembler to identify a recent task or operation performed. Computer device 206 receives images and videos from first camera 216 and/or second camera 218 creating a permanent visual record of the assembly performed near the user specified portion of in-use component 204 indicated with the tip of wand 208.

CDA software further includes a user interface presented on display device 214 and capable, among its numerous features, of showing images and videos taken with first camera 216 and/or second camera 218 to the assembler 228. Depending on the color scheme of in-use component 204, assembly instructions may specify that the tip of wand 208 be set to a contrasting color to aid in processing images taken with first camera 216 and/or second camera 218. If wand 208 has LED lights, assembly instructions executed on computer device 206 may automatically change the lights on the wand's tip to a predetermined color that provides greater contrast against the color scheme of in-use component 204. For example, if in-use component 204 is a printer circuit board with a predominantly green color scheme, some embodiments may change the LED lights of wand 208 to a red or yellow color to make wand 208 more identifiable. Alternative embodiments of wand 208 may work without LEDs and electronics, instead of lights the assembler 228 may be instructed to place different colored caps over the tip of wand 208 to better identify the wand position relative to in-use component 204.

In some embodiments, assembler 228 may use a keyboard 210 to send text data and communicate with computer device 206, embodiments of the CDA software records these communications along with other information used during the assembly. Text data received on computer device 206 from keyboard 210 may confirm data or respond to questions posed from one or more assembly instructions during assembly of a product. Alternatively, keyboard 210 can be used by assembler 228 to control the overall operation of workstation 124 including pausing, starting, or stopping the assembly operations driven by assembly instructions executed on workstation 124. In some embodiments, barcode scanner 212 operatively coupled to computer device 206 is used by assembler 228 for scanning bar codes, this is useful for specifically identifying materials, components, and other products used during the assembly operations.

In some embodiments, materials, pieces, or components used by assembler 228 during assembly are placed in one or more matrix trays 220. Each matrix tray 220 can be customized and transformed to hold a different quantity of materials depending on the number of shim inserts and the shape and number of the pockets within each of the shim inserts. The exact number and type of shim inserts inserted in matrix tray 220 depend on the materials being used during assembly and how the assembly instructions are setup. In some embodiments, assembly instructions specify the numerosity and arrangement of these shims in each matrix tray. During assembly, the instructions identify the matrix tray as well as the particular pocket within the matrix tray that should hold a particular material. Referring to FIG. 2, an exemplary matrix tray 220 may receive up to four shim inserts with pockets ranging from one to eight pockets for each shim. Materials are loaded into matrix trays 220 in advance with the specific materials required for assembling a component and product. Alternate embodiments may include matrix trays, for example, larger than matrix tray 220, capable of receiving a greater number of shim inserts with a greater number of pockets and a range of different sizes. Matrix tray 220 and insertable shims in FIG. 2 may be identified by assembler 228 during assembly using scanner 212 to scan and "read" a bar code affixed to or associated with matrix tray 220 and/or corresponding shims.

One or several power tools connected to computer device 206 may be used by assembler 228 to assemble a product. In some embodiments, a power tool such as a screw gun 230 provides operational information to computer device 206 through sensors measuring torque, operating time, and other data relevant to the particular power tool. Computer device 206 compares the data received from the power tool with the data specified in the various assembly instructions for the product. For example, an assembly instruction may specify that screw gun 230 apply a specific amount of torque to a fastener attached to a component. If computer device 206 detects the torque level is incorrect, in some embodiments, computer device 206 prevents or stops assembler 228 from continuing until the torque level is corrected and the proper torque applied. Moreover, in some embodiments, a power tool may require servicing or recalibration if the operating time of a tool such as screw gun 230 has exceeded a predetermined time or operating interval threshold.

Some embodiments store all the assembly information remotely over network 222 using a network accessible server 224 and databases 226. In the example illustrated in FIG. 2, databases 226 includes at least an ERP database 226a, an assembly sequence database 226b, an assembler train/certify database 226c, and an assembly record database 226d. ERP database 226a includes resource related data for all different aspects of manufacturing and product assembly. For example, the data in ERP database 226a may be used in some embodiments to determine if sufficient materials are available to complete a required number of assemblies.

In addition to materials, ERP database 226a has additional resource information on trained assemblers qualified and ready to assemble specified materials into products. This additional resource information in ERP database 226a may be cross-referenced by those assemblers in assembler train/certify database 226c who have been trained to perform the assembly of certain products. In some embodiments, assemblers may be initially qualified to assemble certain products but over time may eventually need to be recertified and/or retrained. The time interval allowed between retraining may be shorter if the particular assembly sequence is complex and more critical, while a longer time interval between retraining may be allowed if the assembly sequence covers operations considered more routine and less critical to the overall assembly.

If assembler 228 is trained, assembly sequence database 226b provides the sequence of assembly instructions to be followed when assembling a product. The workstation 124 presents instructions for assembling a product using a variety of multimedia data displayed through a user interface on display device 214 and audio through audio speakers (not illustrated in FIG. 2). Likewise, the results of these assemblies are also recorded using a variety of multimedia and then stored in assembly record database 226d for future reference and potential auditing.

Figure 3:
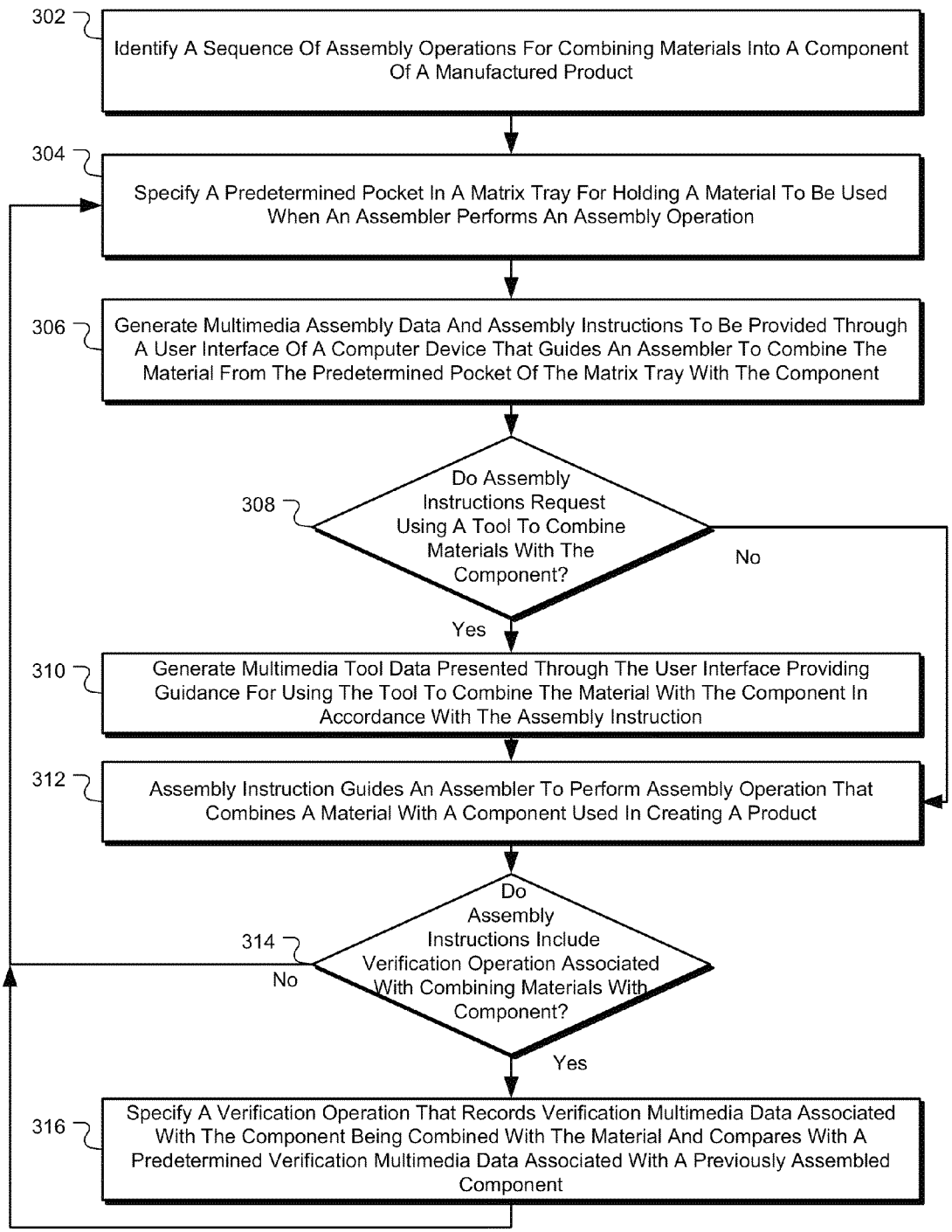
FIG. 3 is a flow chart diagram associated with creating a sequence of assembly operations for use on a computerized assembly workstation in accordance with some embodiments.

Referring to FIG. 3, a flowchart diagram illustrates the operations associated with generating a sequence of assembly operations to be processed by a computer directed assembly workstation. Initially, in some embodiments, a sequence of assembly operations is identified for combining materials into a component of the manufactured product (302). In some embodiments, a manufacture engineer or product designer also creates the sequence of assembly instructions during the design and development of the product. Over time, the sequence of assembly operations may be modified and refined to improve the product quality and reduce associated assembly time.

Each operation may further specify a predetermined pocket in a matrix tray for holding a material to be used when an assembler performs the sequence of assembly operations (304). In some embodiments, the matrix tray is adapted to receive insertable shims with different pocket sizes for holding various size materials. Different shims may be inserted into the tray to accommodate the assembly of different materials as used in the creation of various products. Generally, the person creating the assembly operations also specifies the configuration of the matrix tray including the number of insertable shims and associated pockets. Pockets in the shims are arranged in a row and a column "matrix" configuration, and a specific pocket may be used by referencing a row and column location on the overall matrix tray in accordance with some embodiments. For example, one matrix tray may be configured to receive four 2×2 shims each having 4 individual pockets, the 16 pockets in this embodiment would be addressed according to (X,Y) coordinates corresponding to the rows and columns of a 2×8 matrix. Materials placed in the predetermined pocket of a given matrix are generally taken from a Bill of Materials (BOM) stored in an enterprise database system, such as an ERP system, that manages inventory as products are manufactured. In some embodiments, materials in each pocket are consumed or used by at least one assembly operation performed from the sequence of assembly operations. Since an exact amount of parts for an assembly should be placed in the matrix tray, left over parts in the matrix tray after assembly indicates that the product has likely been assembled incorrectly.

Next, in some embodiments, multimedia assembly data and related assembly instructions are generated for presentation through a user interface of a computer device (306). Multimedia assembly data may include a variety of images, video, text, and audio related to the materials, components, and final product being assembled and produced. Some embodiments of multimedia assembly data may include photos of specific fasteners or group of fasteners in the pocket of a matrix tray along with videos of the fasteners being inserted into a component of a product. Other embodiments of the multimedia assembly data may include images of wire materials held in a matrix tray along with additional images of the wires attached to an insertion point in the component of a product. In addition to images and videos, some embodiments of multimedia assembly data may further include displaying text on the user interface of the computer that the assembler can read and follow. Computer directed assembly operations delivered through a combination of text instructions, videos and images serve as a powerful guide for assemblers combining materials into a component and product in accordance with some embodiments.

In some embodiments, the assembly instructions may determine whether an assembly instruction requests a tool to combine materials with the component or product being assembled (308). If an assembly instruction does not request the use of a tool (308—No), the assembler may attach materials to a component directly with their hands. This might be preferred if hand-tightening a fastener or other material is preferred. Alternatively, the assembly instruction may request using a tool (308—Yes) if the tool would aide in performing the assembly quickly and with a higher degree of accuracy and quality. For example, a power screwdriver designed in accordance with some embodiments having a built-in torque sensor is useful if an assembly instruction requires attaching multiple fasteners to a component at a predetermined torque. Manual tools such as screwdrivers and wrenches may also be used if sensors, such as the torque sensor, are not required or a fastener need not be attached as precisely as a power tool with sensors is capable.

To guide in the use of these tools, the assembly instruction generated also provides multimedia tool data on the user interface (310). Multimedia tool data may include a variety of images, video, text, and audio related to the power tools or manual tools and their use in attaching fasteners or other materials during the sequence of assembly operations. Some embodiments of multimedia tool data may include displaying a schematic image or photo of a tool along with a text description of the tool on the user interface. The text description of the tool may also describe how the tool should be used to attach a fastener or material or which torque setting should be used when tightening the fastener. If the assembler needs even more detailed guidance on using a tool, predetermined audio describing the use of the tool may accompany the images, videos, and other multimedia tool data displayed on the user interface.

Next, the assembly instruction in accordance with some embodiments guides an assembler to perform the assembly operation that combines a material with a component used in creating a product (312). In accordance with some embodiments, the assembly instruction guides the assembler to perform one assembly operation from a sequence of assembly operations for assembling a product. For example, one assembly instruction may instruct an assembler to attach multiple fasteners, such as several metal screws, from a first component to a second component of a product. In this example, the assembly instruction is used to complete the assembly operation associated with attaching the first and second components together as one unit within the final product.

Next, the assembly instruction in some embodiments may optionally include a verification operation to ensure materials and components are properly combined together during the assembly (314). An assembly instruction may further request verification that materials and components have been assembled together correctly (314—Yes). In some embodiments, the verification operation records multimedia verification data associated with a material as it is combined with an in-use component of the finally assembled product (316). As previously described, the in-use component is the portion of the product currently being worked on by the assembler. For example, one verification method includes recording images or video of the in-use component being assembled or worked upon by the assembler and then storing the results in an assembly database for later review and/or analysis. In an alternate approach to verification, the assembler places a wand having a colored tip or end near the portion of the in-use component being assembled as an image or video of the area is recorded by a camera associated with the workstation. In some embodiments, the area near the tip of the wand is further analyzed to determine if the assembler installed the materials in the correct area or portion of the in-use component. In yet another embodiment, computerized comparisons are performed of the images or videos of the in-use component being assembled with predetermined images, videos, and/or other multimedia data associated with a previously assembled component and materials.

Alternatively, in some embodiments, the assembly instruction does not include a verification operation and no verification operation is performed (314—No). When this occurs, (i.e., no verification operation is performed), the next assembly instruction in a sequence of assembly instructions is performed (304) and many of the above sequence of steps in the flowchart of FIG. 3 are repeated.

Figure 4:
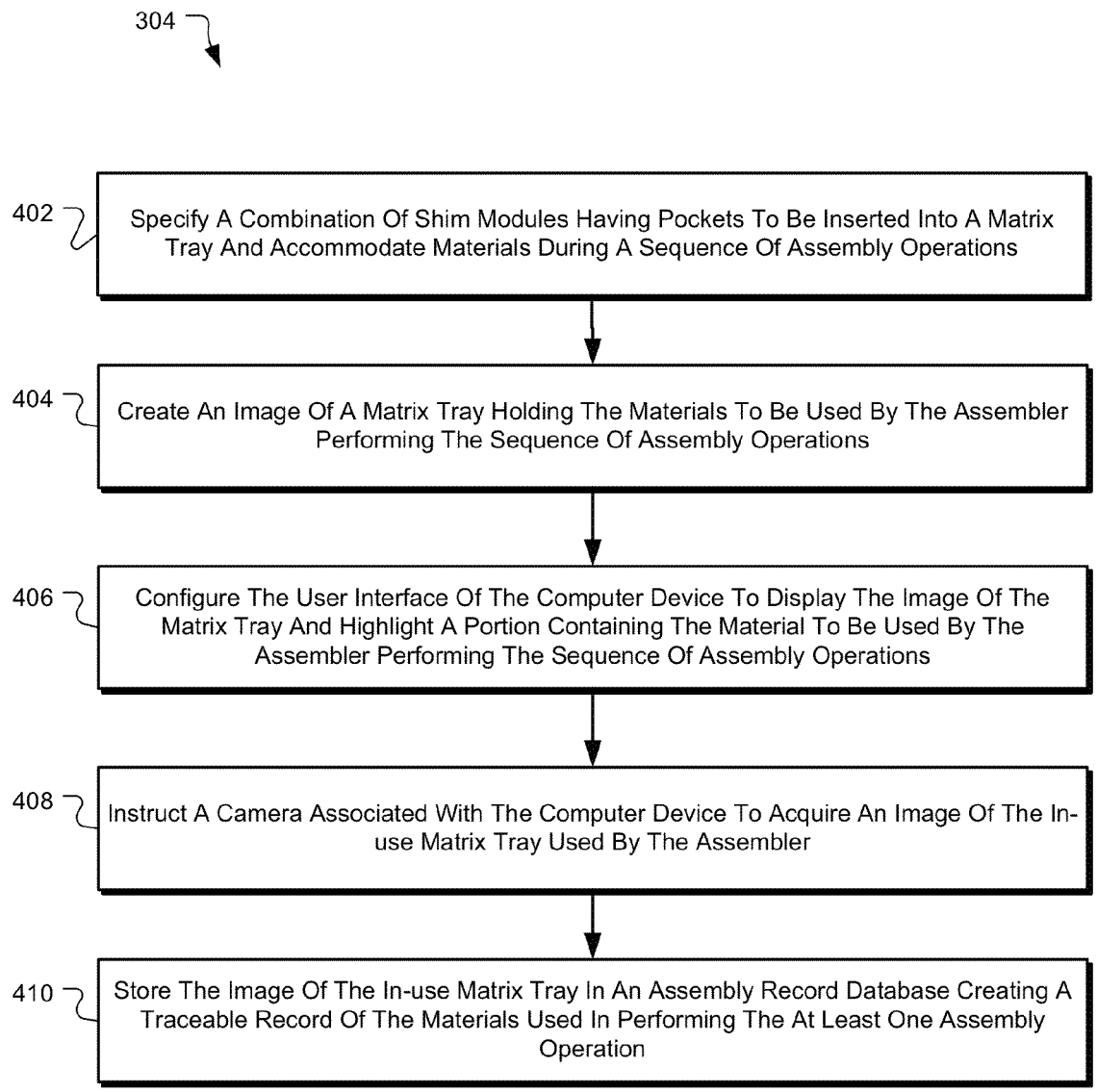
FIG. 4 is yet another flow chart diagram for using multimedia assembly data along with a sequence of assembly operations for guiding the use of matrix trays and insertable shims in accordance with some embodiments.

FIG. 4 provides a flowchart diagram of the operations for specifying matrix trays and selectable inserts used with multimedia assembly data in some embodiments. To accommodate different materials during the assembly, the product designer or manufacture engineer specifies a particular matrix tray design and the materials that should go in the pockets of the matrix tray (402). In some embodiments, the matrix tray is a combination of one or more interchangeable shim inserts tailored to the particular assembly being performed. Each interchangeable shim insert has one or more pockets arranged in rows and columns for holding different size and quantities of materials to be used during the sequence of assembly operations.

Generating the multimedia assembly data begins by creating an image of the matrix tray holding the materials to be used by the assembler performing the sequence of assembly operations (404). In some embodiments, some of the pockets in the matrix tray hold materials while other pockets in the matrix tray are intentionally left empty. Next, the assembly instruction configures the user interface of the computer device to display the image of the matrix tray having materials stored in the various pockets (406). By displaying an image of the matrix tray and materials, the assembler can more readily locate the materials and perform the sequence of assembly operations. In some embodiments, highlighting a portion of the image of the matrix tray near the predetermined pocket containing the material also serves to assist in locating materials during the assembly process. For example, the portion of the image may be highlighted by further displaying a geometric shape, such as a square or circle, around the area of interest in the image of the matrix tray. Assembly instructions in some embodiments may also be configured to send a request through the user interface of the computer device asking the assembler to provide an indication of a pocket on an in-use matrix tray holding the material the assembler intends to use in conjunction with performing the at least one assembly operation. The in-use matrix tray is the tray the assembler is using for the current one or more assembly operations. For example, the assembler may use a wand with a colored tip and move the tip of the wand over the area of the in-use matrix tray where the materials to be used for the assembly are located.

In some embodiments, the assembly instruction may then instruct a camera associated with the assembler's workstation to acquire at least one image of the in-use matrix tray (408). The image taken of the in-use matrix tray in some embodiments should also include the indication from the assembler of the pocket on the in-use matrix tray holding the material to be used with the assembly operation. Image processing may be used in further embodiments to determine how much materials from the portion of the matrix tray have been used by the assembler and whether more materials are left. If the materials in the matrix tray are determined not to match the expected amounts, a warning may be displayed on the user interface of the workstation indicating that some type of error has occurred. Once the image has been processed, in some embodiments, the image of the in-use matrix tray is stored in an assembly record database creating a traceable record of the materials used in performing the assembly operation (410).

Figure 5:
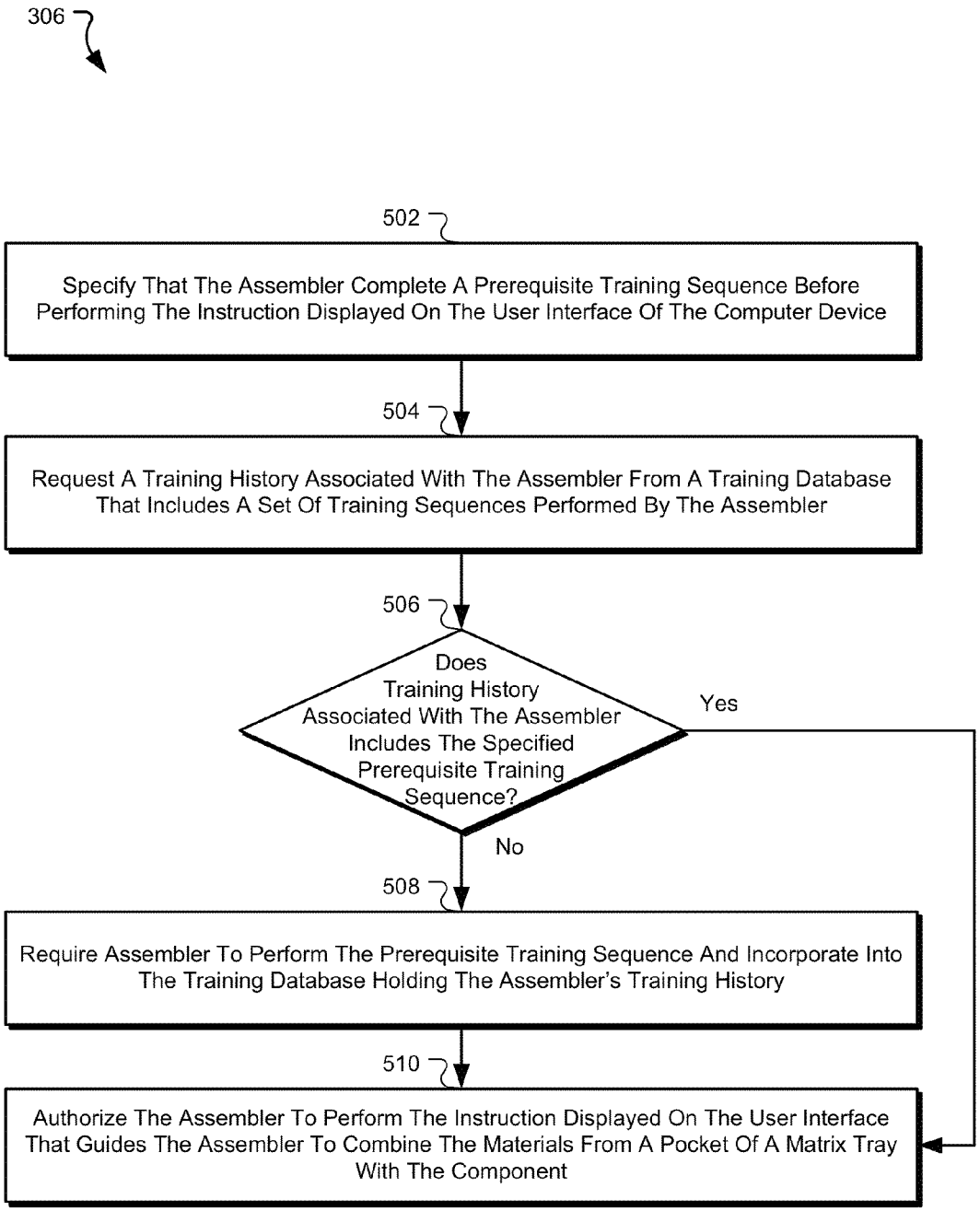
FIG. 5 is another flow chart diagram outlining an exemplary training verification operations performed in accordance with some embodiments prior to providing an assembler authorization to perform an instruction associated with an assembly operation.

FIG. 5 is another flow chart diagram outlining the training verification operations performed in accordance with some embodiments prior to providing an assembler authorization to perform an assembly operation. Training verification operations may be performed in addition to the operations associated with generating multimedia assembly data and assembly instructions in FIG. 3 at 306. In one embodiment, the training verification operations in FIG. 5 ensure that each person assembling a product (also referred to as an "assembler") has been properly trained and that products will be assembled properly with the highest quality and zero defects. Accordingly, an assembly instruction may specify a prerequisite training sequence to be completed by each assembler before performing the instruction presented through the user interface of a workstation or computer device (502). In some embodiments, the prerequisite training sequence is the identical sequence of actions for the particular assembly instruction and assembly operation. For example, if the assembly instruction is to install five (5) standoff screws in a printed circuit board then the prerequisite training sequence may be to perform the identical task of installing five (5) standoff screws in a printed circuit board with a power tool. Alternatively, similar tasks of installing three (3) or more standoff screws in a printed circuit board may also satisfy the prerequisite training sequence for the assembly instruction.

Next, the assembly instruction may then request a training history associated with an assembler from a training database that includes a set of training sequences performed by the assembler (504). In certain embodiments, a detailed history of the various skills amassed by each assembler is kept or stored in a training database. Some skills in the training database may be acquired when the assembler performs a training exercise while other skills in the training database may result when the assembler performs other assemblies and task. In some embodiments, each assembly instruction may check the training database to determine whether the assembler is trained to perform the particular instruction or task.

A determination is then made whether the training history associated with the assembler includes the specified prerequisite training sequence (506). For example, the training history for the assembler may already include a task of installing five (5) standoff screws in a printed circuit board with a power tool. Accordingly, in the event the assembler already meets the specified prerequisite training sequence (506—Yes), some embodiments will then authorize the assembler to perform the instruction displayed on the user interface and guide the assembler to combine the materials from a pocket in a matrix tray with the component (510). Alternatively, the assembler may be required to perform a prerequisite training sequence when the determination indicates that the assembler has not been trained with the prerequisite training sequence (506—No). If this occurs, the assembler must first perform the prerequisite training sequence before proceeding with the assembly instruction and further operations to assemble the product (508). Once the assembler performs the prerequisite training sequence, in certain embodiments, the assembler is then authorized to perform the instruction displayed on the user interface (510).

Figure 6A:
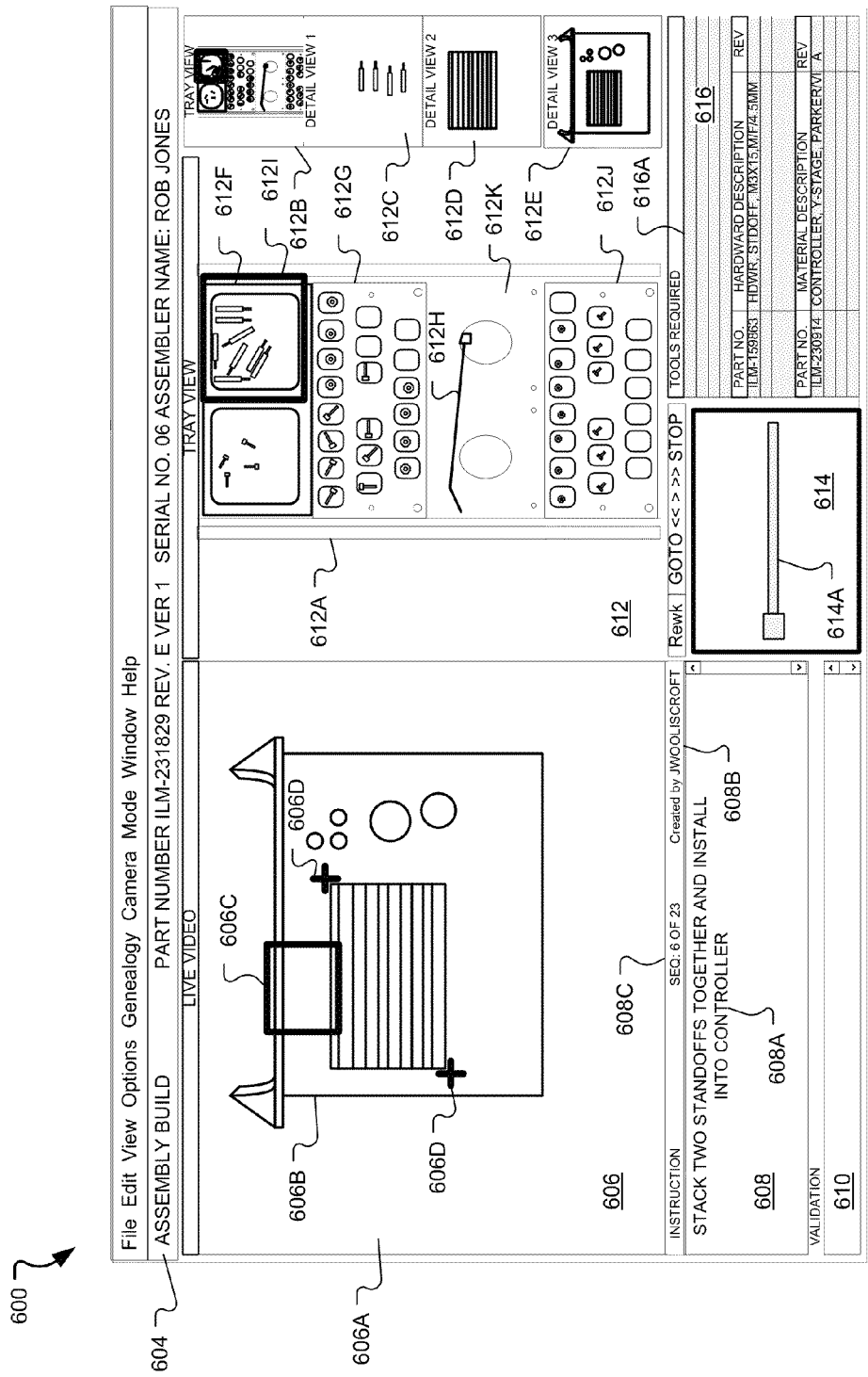
FIG. 6A is a schematic diagram of an exemplary computer implemented user interface for interacting with a sequence of assembly operations in accordance with some embodiments.

FIG. 6A schematically illustrates an exemplary computer-implemented user interface method for interacting with assembly operations in accordance with some embodiments. Areas displayed on the user interface assist and guide an assembler through the assembly operations to create a manufactured product. These areas include assembly build information area 604, in-use view area 606, text assembly instructions area 608, validation area 610, preassembled view area 612, tool area view area 614, and inventory area 616.

Assembly build information area 604 of the user interface details information on the product being assembled and the assembler currently performing the assembly on the workstation. In this example, assembly build information area 604 provides a part number and details on the particular release and version of the part number. In addition, the person associated with assembling the particular product is identified as "Rob Jones". Details from assembly build information area 604 are permanently recorded in an assembly database along with other details associated with the assembly of the components and this product.

In-use view area 606 is an area on the user interface that provides an image of an item the assembler is currently working on in conjunction with assembling the manufactured product. Some embodiments of the in-use view area 606 display live video recordings of the in-use item as the assembler positions the in-use item in front of a camera on the workstation and performs a task in accordance with one of the assembly instructions. The in-use item may include one or any number of different items used by an assembler during the assembly. The in-use items in some embodiments may include a component making up a portion of the manufactured product, a matrix tray holding various materials, or a material, such as a fastener, to be attached to the component of the product being assembled.

In some embodiments, live video displaying the in-use item being assembled may highlight a portion of the image to assist the assembler in performing an assembly instruction. For example, in-use view area 606 in FIG. 6A displays a component 606B lying on a workbench surface 606A ready for assembly. In this embodiment, a geometric shape such as rectangle highlight 606C overlays the image of component

606B and highlights where materials from a matrix tray are to be attached. To further assist the assembler, text assembly instructions area 608 includes a sequence of assembly instructions for the assembly of component 606B into a product. In reference to the area under rectangular highlight 606C, exemplary text assembly instructions specified in assembly instruction 608A directs the assembler to, "STACK TWO STANDOFFS TOGETHER AND THEN INSTALL INTO CONTROLLER." Additionally, assembly instructions area 608 in FIG. 6 include a created-by-entry 608B that stores the name of the person who created the assembly instructions—in this case, a J.WOOLISCROFT—and an assembly instruction sequence counter 608C that indicates the current assembly instruction is 6 out of 23 instructions.

Preassembled view area 612 is an area on the user interface that provides an image of a preassembled item to guide the assembler in the assembly of the manufactured product. The preassembled item is an exemplary component assembled correctly in advance by a skilled assembler and now can be used as a model or example for the assembly of new items displayed in the in-use view area 606. In the illustrated exemplary embodiment, preassembled view area 612 includes a matrix tray 612A assembled with insertable shim 612F having two pockets with fasteners, insertable shim 612G having twenty pockets with fasteners, and insertable shim 612J having twenty pockets with fasteners. As illustrated, a portion of matrix tray 612A also has an open area 612K that is holding a strap fastener 612H ready to be assembled into a component or product.

Preassembled view area 612 further includes several other selectable views in addition to tray view 612B that include detail view 1 612C, detail view 2 612D and detail view 3 612E. In some embodiments, a portion of the preassembled item may be highlighted in preassembled view area 612 to help the assembler find a material or attach a material to the proper component. In one illustrated embodiment in FIG. 6A, matrix tray 612A has used rectangular highlight 612I to draw the attention to the location of the standoffs referenced in the sequence of assembly instructions 608A in the assembly instruction view area 608 as previously described. In general, the preassembled item may include a variety of different items including a matrix tray assembled with materials (such as matrix tray 612A), a product assembled with one or more components, a component assembled with one or more materials (such as component 612E), and materials to be attached to the at least one in-use item the assembler is currently using (such as materials 612C). In accordance with some embodiments, the matrix tray 612A is one preassembled item having several insertable shims and numerous fasteners.

Tool view area 614 on user interface 600 provides an image of a tool as specified in the sequence of assembly instructions. The tool displayed in tool view area 614 is specified in the assembly instructions to assist the assembler in selecting the next tool to use in the subsequent steps in assembling the manufactured product. For example, assembly instructions specify wand 614A as the tool to be used by the assembler to assist in verifying that an assembly instruction has been performed correctly. Other tools that may be specified to appear in tool view area 614 include manual tools and power tools as appropriate for the particular assembly.

Figure 6B:
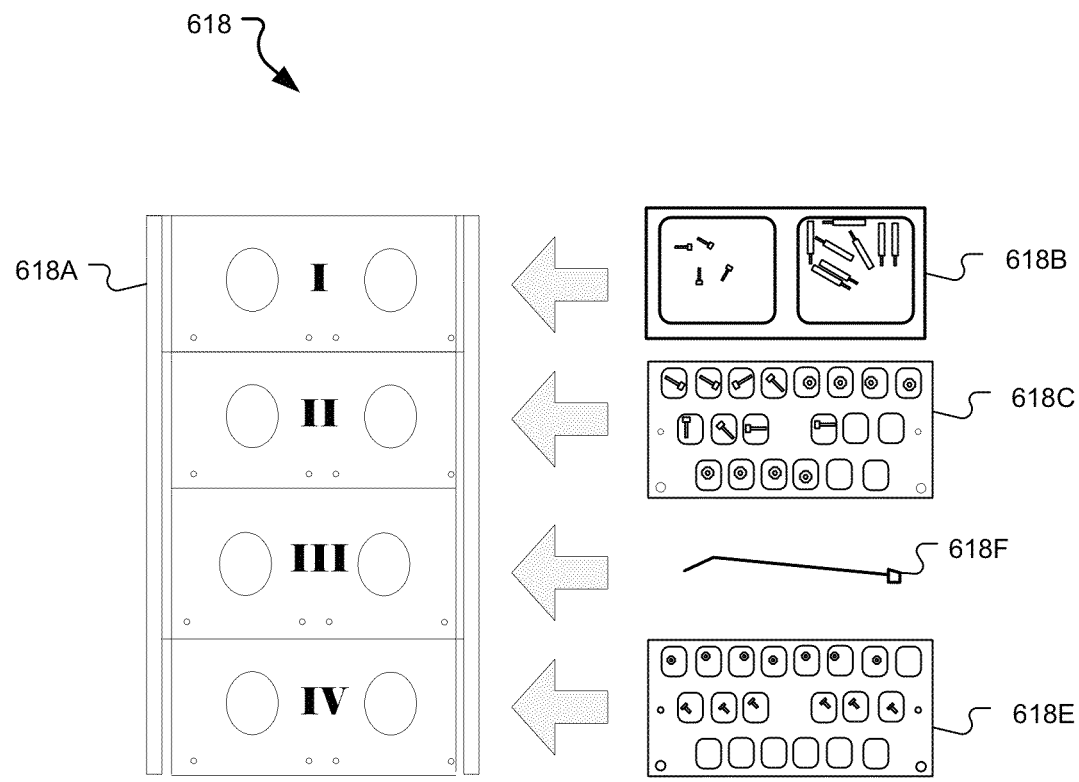
FIG. 6B is a schematic diagram of an exemplary matrix tray with multiple insertable shims and a variety of pockets for materials in accordance with some embodiments.

FIG. 6B illustrates an exemplary matrix tray and insertable shims for holding materials in accordance with some embodiments. Unlike conventional material trays fixed in a single configuration, matrix tray 618 can be tailored to accommodate the size and number of materials required for each product. Different insertable shims allow both the size and the number of pockets in matrix tray 618 to change to provide suitable capacity, yet keep a common form factor for ease of handling and compatibility. Since the pockets in matrix tray 618 are kept in predetermined rows and columns, assembly instructions reference specific trays using a bar code of each tray and then a row/column (e.g., (x,y) coordinates) to address specific pockets in the tray. As an added benefit, this regular organization enables computers executing image processing routines to more easily recognize the pockets, and the materials kept in these pockets.

Database applications and embodiments of the present invention may also identify and associate materials with assembly instructions as they are performed by the assembler. In the illustrated exemplary embodiment in FIG. 6B, each of the twenty (20) pockets from insertable shim 618C or 618E may be digitally identified with (x,y) coordinates or enumerated as pockets 0 through 19 by one or more database programs. In some embodiments, image processing routines may capture images of matrix tray 618 during assembly and quickly determine if the number of fasteners or other material for the assembly instruction are correct. To aid in further identification and automation, some embodiments may individually identify matrix tray 618 using a combination of one or several of a bar code (not shown), a QR Code (Quick Response Code—a trademark of Denso Wave, Japan) (not shown) or passive RFID technology attached to matrix tray 618 (not shown).

In illustration of one embodiment, a tray portion 618A of matrix tray 618 has been separated from insertable shims 618B, 618C, and 618E making apparent the flexibility and accompanying advantages of the design. Tray portion 618A in some embodiments has four (4) areas labeled I, II, III, and IV adapted to receive either an insertable shim or directly receive material. For example, since strap fastener 618F cannot be contained within an insertable shim, it is instead placed directly on the area of tray portion 618A labeled III. As illustrated, insertable shims 618B, 618C, and 618E may be replaced with different shims and inserted back onto tray 618A in different configurations as demanded by a different set of assembly instructions and specific product being manufactured. In some embodiments, shims may include two (2) pockets such as with insertable shim 618B or twenty (20) pockets as exemplified by insertable shim 618C. Other shims may contain greater than two (2) pockets yet fewer than twenty (20) pockets (not shown) with the exact number of pockets depending on the size and quantity of the materials used by a particular assembly instruction or instructions. Alternate embodiments may also include tray portions larger than tray portion 618A as illustrated in FIG. 6B and formed from different geometric shapes other than a rectangle or other conventional geometries. It is also possible that a tray portion of a matrix tray has greater than just the four (4) areas illustrated in tray portion 618A; indeed the size of the tray portion 618A may be larger or smaller depending on the size of materials being used and the application.

Figure 7A:
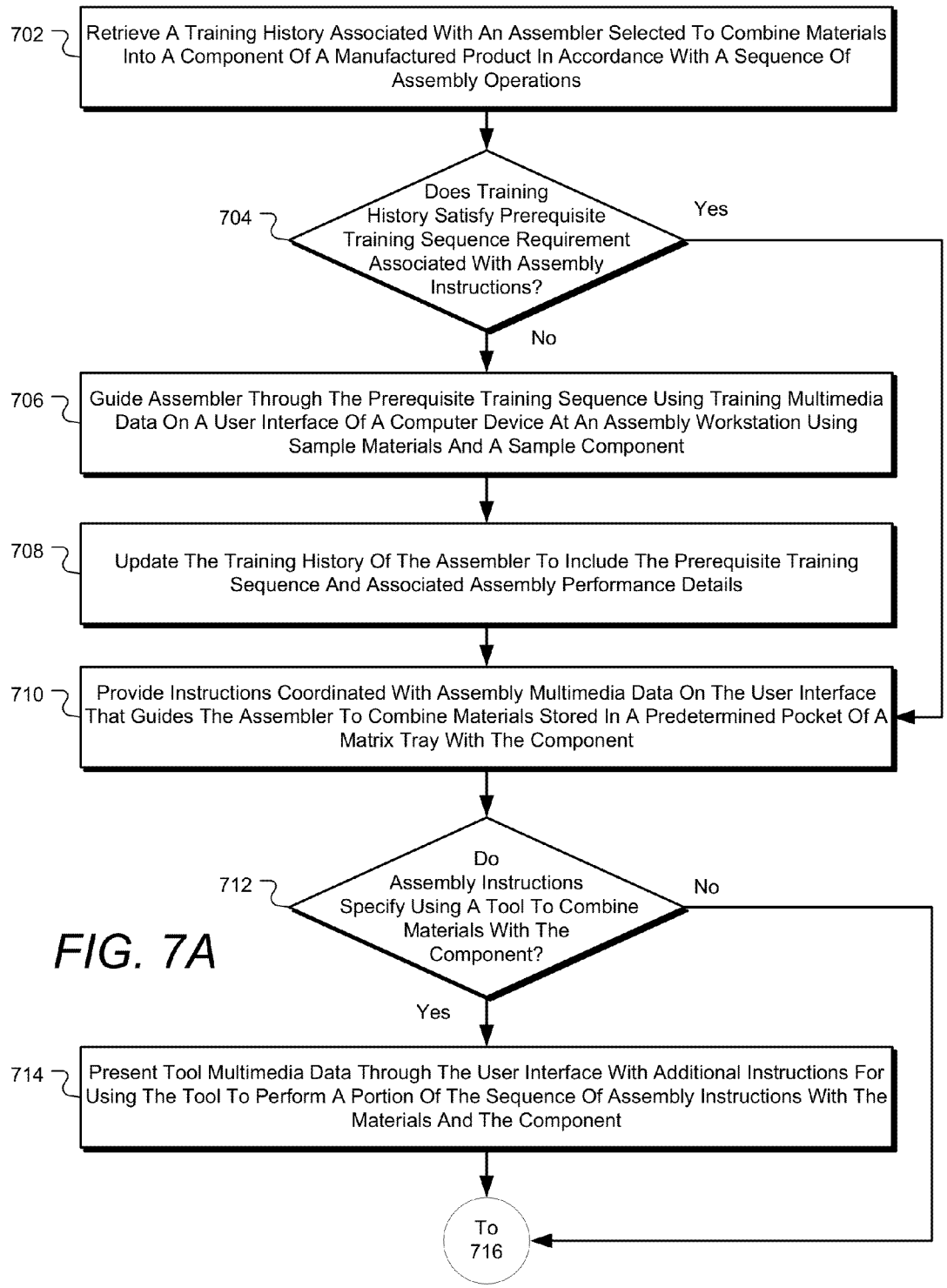
FIGS. 7A-7B are additional flowchart diagrams outlining exemplary interactions associated with performing the assembly operations on a computer directed assembly workstation in accordance with some embodiments.
Figure 7B:
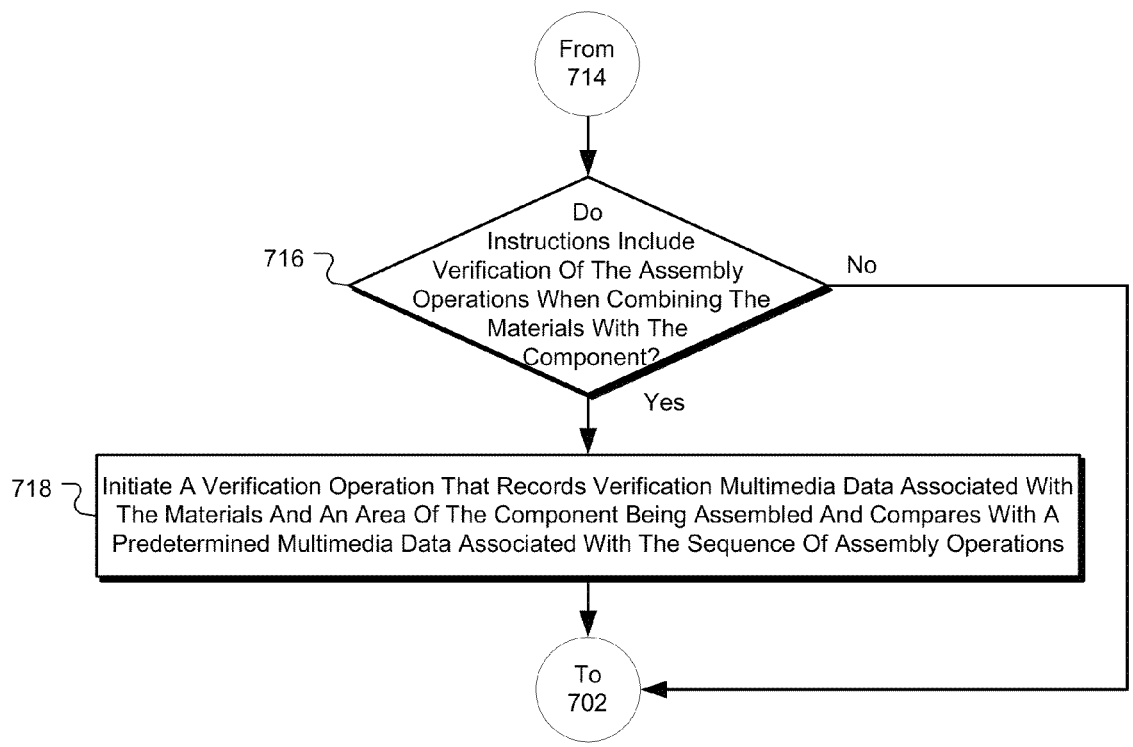

FIGS. 7A and 7B illustrate a flowchart diagram of an exemplary operation associated with assembling materials into a component of a manufactured product. In some embodiments, these flowchart operations are performed on a workstation as an assembler performs an assembly sequence of instructions to create the manufactured product. Initially, in some embodiments a training history is retrieved that is associated with an assembler selected to combine materials with a component of a manufactured product in accordance with a sequence of assembly operations (702). The training history may be stored in a training database that describes the experience and/or training that an assembler has achieved through a combination of training assemblies and experience assembling other components together into products.

Preferably, the assembler selected to assemble the product is already sufficiently trained and competent to perform each instruction of the assembly sequence. To make this determination, embodiments of the present invention check if the training history for the assembler satisfies a prerequisite training sequence associated with the sequence of assembly instructions (704). In one exemplary embodiment, the prerequisite training sequence may require the assembler to have experience or training installing a set of four standoffs with a power screwdriver before proceeding with the remaining instructions of the assembly sequence. This specific experience must be acquired through training assemblies or practice assemblies before the assembler can make a production assembly for shipment.

If the assembler's training history does not include sufficient experience (704—No), in certain embodiments, the assembler is guided through a prerequisite training sequence using training multimedia data on a user interface of a computer device at an assembly workstation (706). In some embodiments, the assembler is required to perform the actions associated with the training using sample materials and a sample component. In some embodiments, training multimedia displayed on a user interface of the workstation includes images of the materials and components being assembled and text assembly instructions to guide the assembler through the training.

Once the assembler has performed the prerequisite training sequence, in some embodiments, the training history of the assembler is updated to include the prerequisite training sequence and associated assembly performance details (708). In some embodiments, the assembler's training history is updated in a training database to include a speed and an accuracy with which the assembly was performed. Speed and accuracy information helps determine how quickly an assembler is likely to perform a sequence of assembly instructions and also how many products the assembler is capable of assembling over a period of time. This performance related information helps determine how to establish work schedules of people assembling certain products and meet product delivery goals. For example, if a product delivery must take place quickly and with high quality results and zero-defects then only people who have a history and are capable of assembling the product meeting these constraints will be selected to assemble the product and fulfill the order.

If the assembler's training history does include sufficient experience (704—Yes), in some embodiments, assembly instructions are provided through the user interface to guide the assembler in combining materials with the component (710). To further assist the assembler, in some embodiments, specific materials stored in predetermine pockets of a matrix tray are identified using a variety of multimedia data and guidance is provided on assembling these materials with the component.

In some embodiments, assembly instructions determine whether a tool is used to combine materials with a component (712). If an assembly instruction does request using a tool (712—Yes), the assembler is presented with a variety of multimedia tool data through the user interface. The multimedia tool data guides the assembler in using the tool to perform a portion or all of the sequence of assembly instructions. In some embodiments, the tool multimedia data may be a single image of a tool, a video of the tool, or a combination of images and video along with instructions for using the tool to assist in performing the particular assembly instruction or instructions. For example, if the tool's usage is routine or typical then the multimedia tool data may only need to identify the tool using a single image displayed on the user interface. However, if the assembly instruction uses the tool in a more complicated manner, the multimedia tool data may include images and videos along with detailed instructions for using the tool.

In some embodiments, the assembly instruction may not request using a tool when the assembler can use their hands to perform an assembly or other task (712—No). For example, an assembly instruction may request that the assembler insert a wire connector with a group of wires into a connector receiver on a printed circuit board. Referring to FIG. 7B, some embodiments may then determine if the assembly instructions should also be verified using one or more verification operations (716). In the event the assembler does not have to verify the assembly instruction (716—No), the above described steps in FIG. 7A starting with step 702 are repeated until all the assembly instructions for the product are completed.

Alternatively, some embodiments may indeed require a verification operation to ensure the assembly instructions were performed correctly (714—Yes). In some embodiments, the verification operation records verification multimedia data associated with combining the materials and the component (718). Once the assembler completes the assembly instruction or instructions, in certain embodiments, an image or video of the in-use component being assembled is taken and stored in an assembly record database as a permanent record of the assembled component or product. In further embodiments, the verification operation may also request the user to point to or identify a location of the portion of the in-use component being assembled using a wand and then take the images or videos as a permanent record. In another embodiment, image processing functions are utilized on a workstation to compare the images of the in-use component with a predetermined multimedia assembly data showing a previously assembled component or product known to be assembled correctly and with a high quality.

Figure 8:
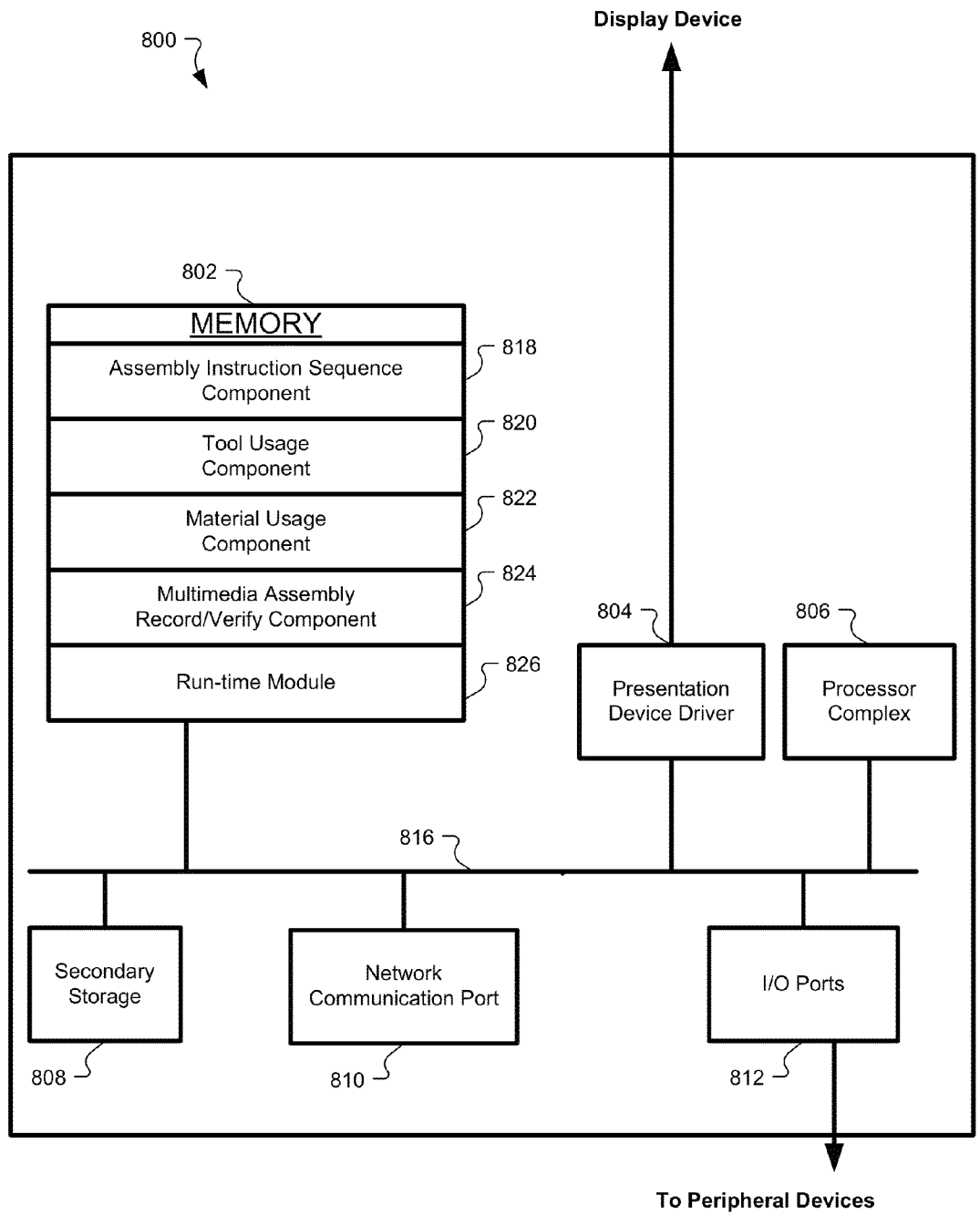
FIG. 8 is a schematic block diagram of an exemplary computer device used in generating and performing computerized assembly operations in accordance with some embodiments.

In accordance with some embodiments, FIG. 8 is a schematic block diagram of an exemplary computer device 800 capable of creating and processing assembly instructions for guiding assemblers manufacturing products. Computer device 800 includes a memory 802, presentation device driver 804 coupled to a display device (not shown), a processor complex 806, secondary storage 808, network communication port 810 and I/O ports 812 coupled to a variety of different input-output devices over an interconnect 816. In particular, processor complex 806 may be a single processor, multiple processors or multiple processor cores on a single die. It is contemplated that processor complex 806 represents the one or more computational units available in computer device 800. Further, input-output devices coupled to I/O ports 812 may include one or more of the following: cameras, power tools, power tools with sensors, wands, scanners, keyboards, mice, any other peripheral device previously described in conjunction with FIG. 2, and other suitable devices. Network communication port 810 may further include a WiFi, WiMAX or other connection to a network such as the Internet. Network communication port 810 may also include wired connections to the Internet using CAT 5/6, Fiber Channel or similar approaches.

In the illustrative embodiment in FIG. 8, memory 802 includes storage locations that are addressable by the processor complex 806 and adapters for storing software program code and data. For example, memory 802 may include a form of random access memory (RAM) that is generally cleared by a power cycle or other reboot operation and classified as "volatile" memory. Processor complex 806 and various adapters may, in turn, comprise processing elements and logic circuitry configured to execute the software code and manipulate the data stored in the memory 802. In comparison, secondary storage 808 may be a form of non-volatile storage for storing a copy of run-time environment 826, applications and other data used by computer device 800. Alternatively, secondary storage 808 may include conventional magnetic tapes or disks, optical disks such as CD-ROM, DVD, magneto-optical (MO) storage or any other type of non-volatile storage devices suitable for storing large quantities of data. These latter storage device types may be accessed locally through a direct connection to interconnect 816 or remotely in the "cloud" through network communication port 810 with an appropriate network protocol.

In some embodiments, memory 802 includes assembly instruction sequence component 818, tool usage component 820, material usage component 822, multimedia assembly/verify component 824, and run-time module 826. Assembly instruction sequence component 818 includes methods and systems for creating assembly sequences for combining materials, components, and parts into products as described previously in conjunction with FIG. 3 through FIG. 5. This assembly instruction sequence component 818 also processes these assembly instructions to guide and control assemblers creating products also as previously described in conjunction with figures FIG. 7A-7B. Tool usage component 820 incorporates the creation and presentation of multimedia tool data on a user interface to also assist in guiding an assembler creating products. As previously described in conjunction with FIG. 6B, material usage component 822 includes data associated with the configuration of matrix trays, insertable shims, and the materials stored in these for the creation of different products. Multimedia assembly record/verify component 824 includes images, video, data, and processes for verifying the assembly of products as also described in conjunction with at least FIG. 2-4 and FIG. 7A-7B. Lastly, memory 802 includes run-time environment 826 portions of which typically reside in memory and are executed by the processing elements. Run-time environment 826 may be based upon a general-purpose operating system, such as Linux, UNIX® (a trademark of The Open Group), or WINDOWS® (a trademark of Microsoft Corporation) or any other general-purpose operating system as well as mobile or embedded operating systems based upon ANDROID™ (a trademark of Google, Inc.), BLACKBERRY® (a trademark of RIM Inc.), QNX™ (a trademark of QNX Software Systems, Ltd) and Apple iOS™ (a trademark of Apple, Inc.) and others as used in mobile phones, mobile devices, touchpads, or touchscreen-based computer systems.

Figure 9A:
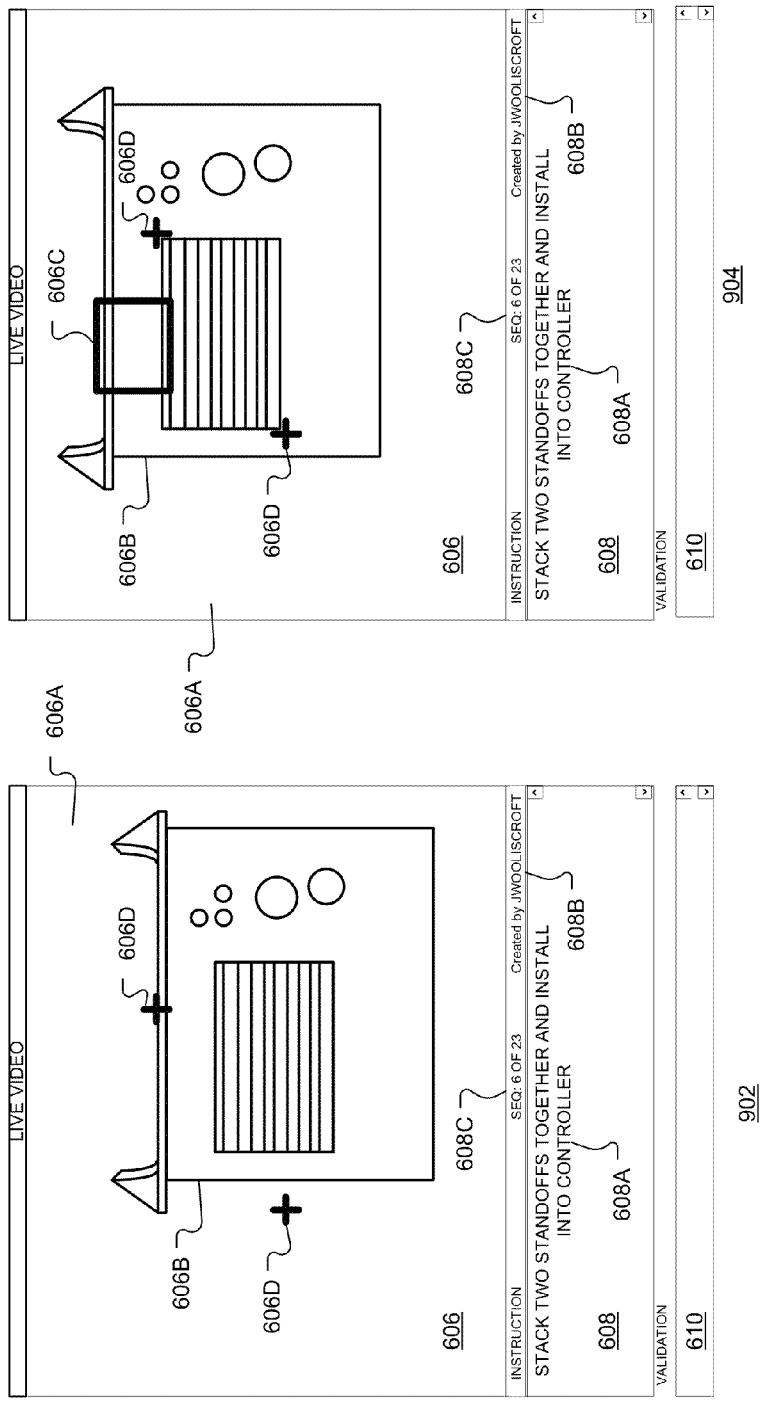
FIGS. 9A-9B schematically illustrate using a wand with the computer-implemented user interface and verifying completion of one or more assembly instructions in accordance with some embodiments.
Figure 9B:
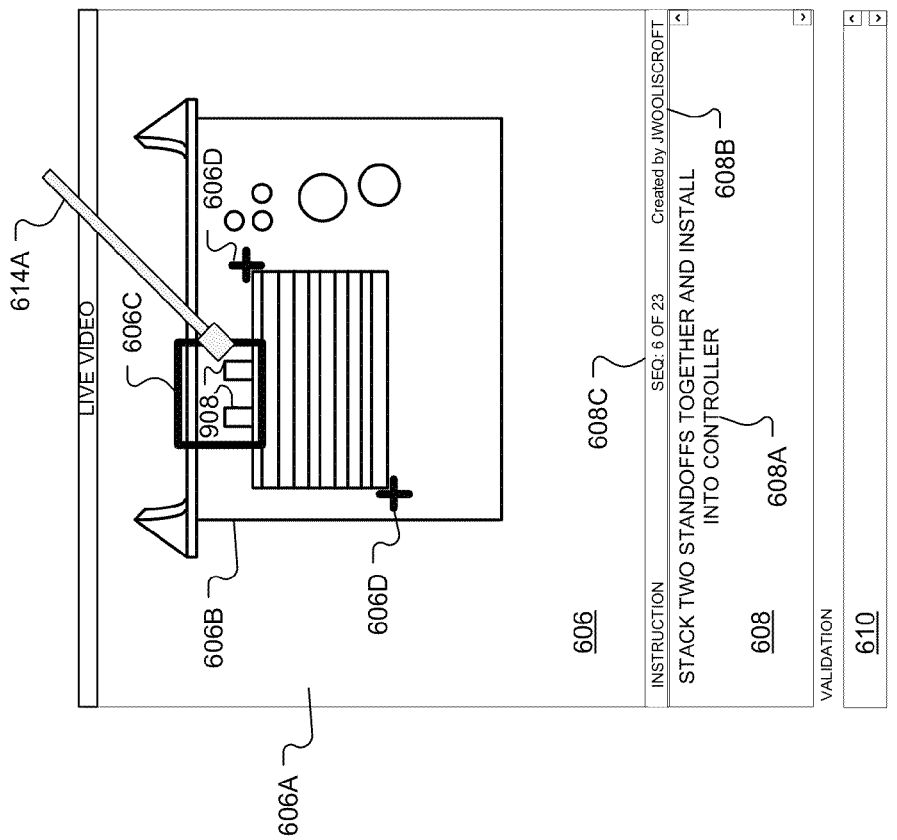
Figure 9C:
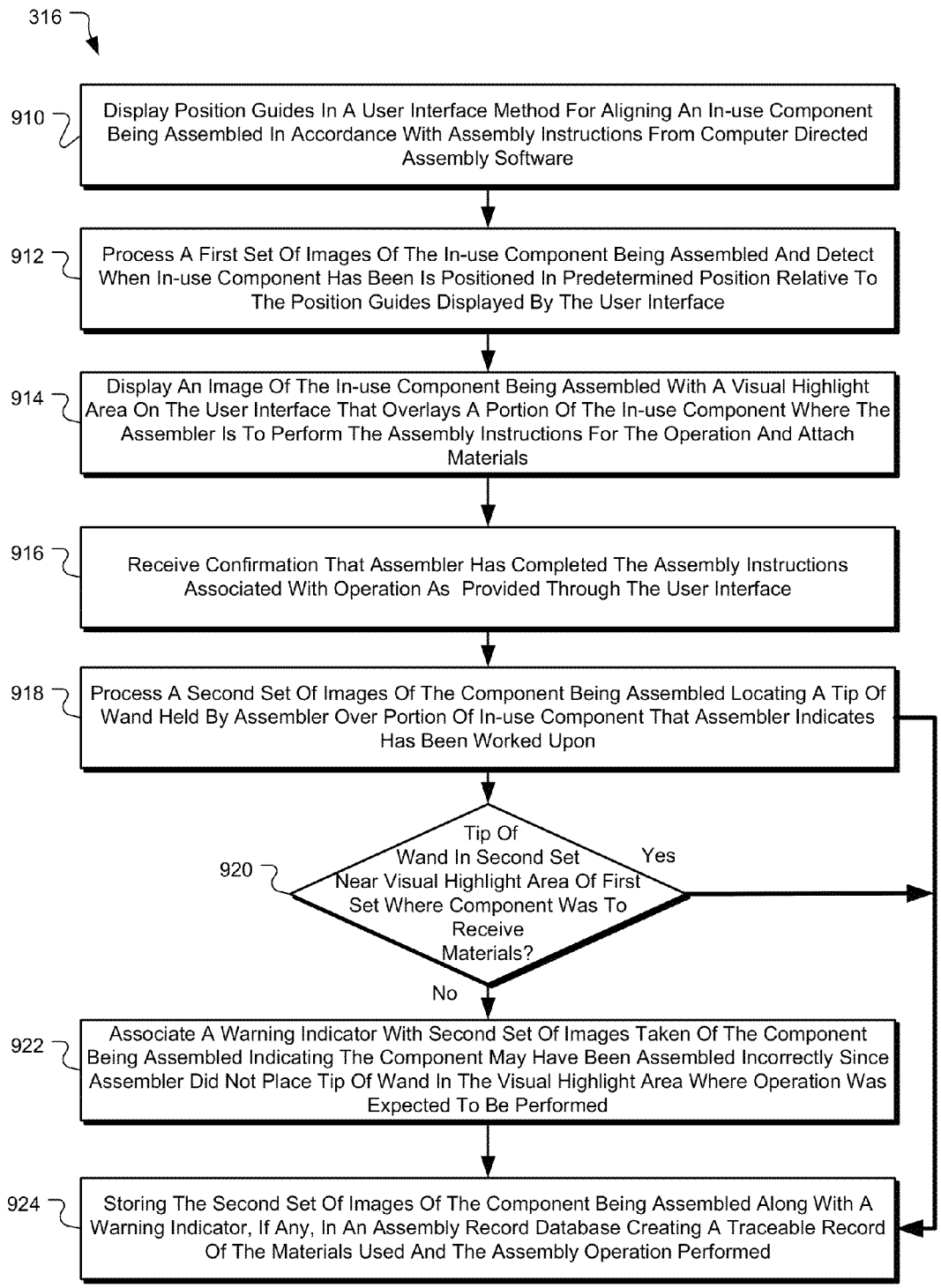
FIG. 9C is a flowchart diagram of exemplary operations for using a wand and a computer-implemented user interface to verify the completion of a sequence of one or more assembly instructions in accordance with some embodiments.

FIGS. 9A-9C schematically illustrate using a wand with the computer-implemented user interface and verifying completion of one or more assembly instructions in accordance with some embodiments. In user interface excerpt 902, the assembler has placed component 606B on workbench surface 606A which is under a camera or other image capture device (not shown) and displayed in the user interface "live" or in real-time as a video or sequence of images. Generally, component 606B may also be referred to as the in-use component since it is the component in-use by the assembler when performing the assembly instructions. In most cases, component 606B is not aligned with position guides 606D as each assembly instruction identified with assembly instruction sequence counter 608C may require component 606B in a different position.

Before proceeding with assembly instruction 608A from text assembly instruction area 608, the assembler aligns component 606B with position guides 606D, as illustrated in user interface excerpt 904, enabling the assembler to be guided through the assembly and verification processes in some embodiments. In one embodiment, CDA software processes a first set of images taken from user interface excerpt 904 to determine that component 606B is now properly aligned with position guides 606D. As a result, the user interface displays component 606B overlayed with a visual highlight area such as rectangular highlight 606C. Rectangular highlight 606C is one exemplary visual highlight area used to overlay an area of interest on a component for performing the assembly instructions. Many other shapes and/or sizes can be used to create a visual highlight area other than the rectangular highlight 606C as illustrated.

Once the rectangular highlight 606C appears, the assembler follows assembly instructions 608A and, in this embodiment, attaches two standoffs together and into a controller as illustrated in user interface excerpt 906 shown in FIG. 9B. To verify completion of the assembly instructions, the assembler locates a tip of wand 614A over the portion of component 606B alerting CDA software that the assembler is ready to verify performance of the assembly instructions. CDA software processes a second set of images taken from user interface excerpt 906 recognizing the presence of the tip of wand 614A in relationship to rectangular highlight 606C. In some embodiments, the second set of images is stored in an assembly record database including an image of component 606A, and rectangular highlight 606C with installed standoffs 908 identified with the tip of wand 614A. If processing the second set of images indicates wand 614A is not close enough to the area within rectangular highlight 606C, in some embodiments, a warning indicator indicates in the assembly record database along with the second set of images that the assembler has made an error.

FIG. 9C is a flowchart diagram of exemplary operations for using a wand and a computer-implemented user interface to verify the completion of a sequence of one or more assembly instructions in accordance with some embodiments. This wand-based verification approach illustrated in FIG. 9C and described below can be used for verification of assembly instructions as described in reference to final assembled product 316 shown in FIG. 3. In this embodiment, the user interface displays position guides for aligning an in-use component being assembled in accordance with assembly instructions for a manufactured product (910). In some embodiments, the position guides may appear on the user interface as a pair of cross-hairs positioned diagonally and separated by a distance corresponding to at least one dimension of the in-use component. For example, the distance between the cross-hairs used as position guides 606D in user interface excerpt 902 can bracket a rectangular portion of the component 606B as illustrated in FIG. 9A.

In some embodiments, a first set of images of the in-use component is processed to determine when the in-use component has been positioned in a predetermined position relative to the position guides displayed by the user interface (912). The first set of images can be taken using an image capture device taking individual images (i.e., camera mode) or a stream of images (i.e., video mode). Edges and other distinctive areas of the in-use component are analyzed and compared with the position guides to determine when the in-use component is positioned correctly and the verification operation can continue.

In some embodiments, an image of the in-use component being assembled is displayed with a visual highlight area that overlays a portion of the in-use component (914). The visual highlight area indicates to the assembler where to perform the assembly instructions and attach one or more materials. Indeed, the visual highlight area can only accurately guide the assembler after the in-use component is confirmed to be in the predetermined position relative to the position guides. For example, rectangular highlight 606C in user interface excerpt 904 shown in FIG. 9A illustrates one type of visual highlight area useful in guiding an assembler provided position guides 606D are aligned with the edges of component 606B as illustrated.

Once the visual highlight area is presented on the user interface, the assembler proceeds to follow the assembly instructions to attach materials or perform other operations. As seen in FIG. 9B, the user interface excerpt 906 shows that an assembler has attached standoffs 908 onto the controller portion of component 606B as provided by assembly instructions 608A. For each assembly instruction, the assembler may provide an indication that the assembly instruction was completed by entering a predetermined keystroke on a keyboard, a click of a mouse, or a voice command into a headset or microphone, for example. In addition, the assembler points to the area of the component with a tip of a wand specifying an area on the component where the assembly has taken place.

The user interface receives the confirmation (916) and proper completion of the assembly instructions by the assembler is verified. To begin, a second set of images of the in-use component are acquired and processed through the user interface. In one embodiment, the processing locates the tip of a wand being held by the assembler. If the assembler is performing the assembly correctly, the tip of the wand should be pointing near the visual highlight area where the assembler was directed to attach materials and perform the assembly instructions (920—Yes). Once it is determined that the tip of the wand is over the proper portion of the component, the second set of one or more images of the component being assembled are stored in an assembly record database. These images stored along with serial numbers of the component and other information related to the assembly create a traceable record of the materials used and the assembly operation performed. For example, these records may be useful as assurance that the component was assembled properly as well as providing information if later it is found that the component is not working properly. By reviewing the images, whether taken as individual photos or as part of a video, verifying the integrity of the assembled product or troubleshooting problems related to the manufacturing of a component or product is made much easier.

Alternatively, in some embodiments, a warning indicator is associated with the second set of images when the tip of the wand is not pointing near the visual highlight area provided in the user interface (920—No). If the wand is pointing at the wrong area of the component there is a strong likelihood that the assembler is also not performing the assembly instructions correctly. Accordingly, a warning indicator is added to the data and the second set of images stored in the assembly record database so they can be readily identified and reviewed at a later time. For example, the assembler may be attaching materials to the wrong area of a component or may not be paying attention to the assembly process and, thus, likely to be making various other errors. In some embodiments, the warning indicator in the assembly record database can be configured to trigger sending an email, a text message, or other electronic reminder to staff overseeing production and urging them to check with the assembler and/or do a visual inspection of the component being assembled.

Figure 9D:
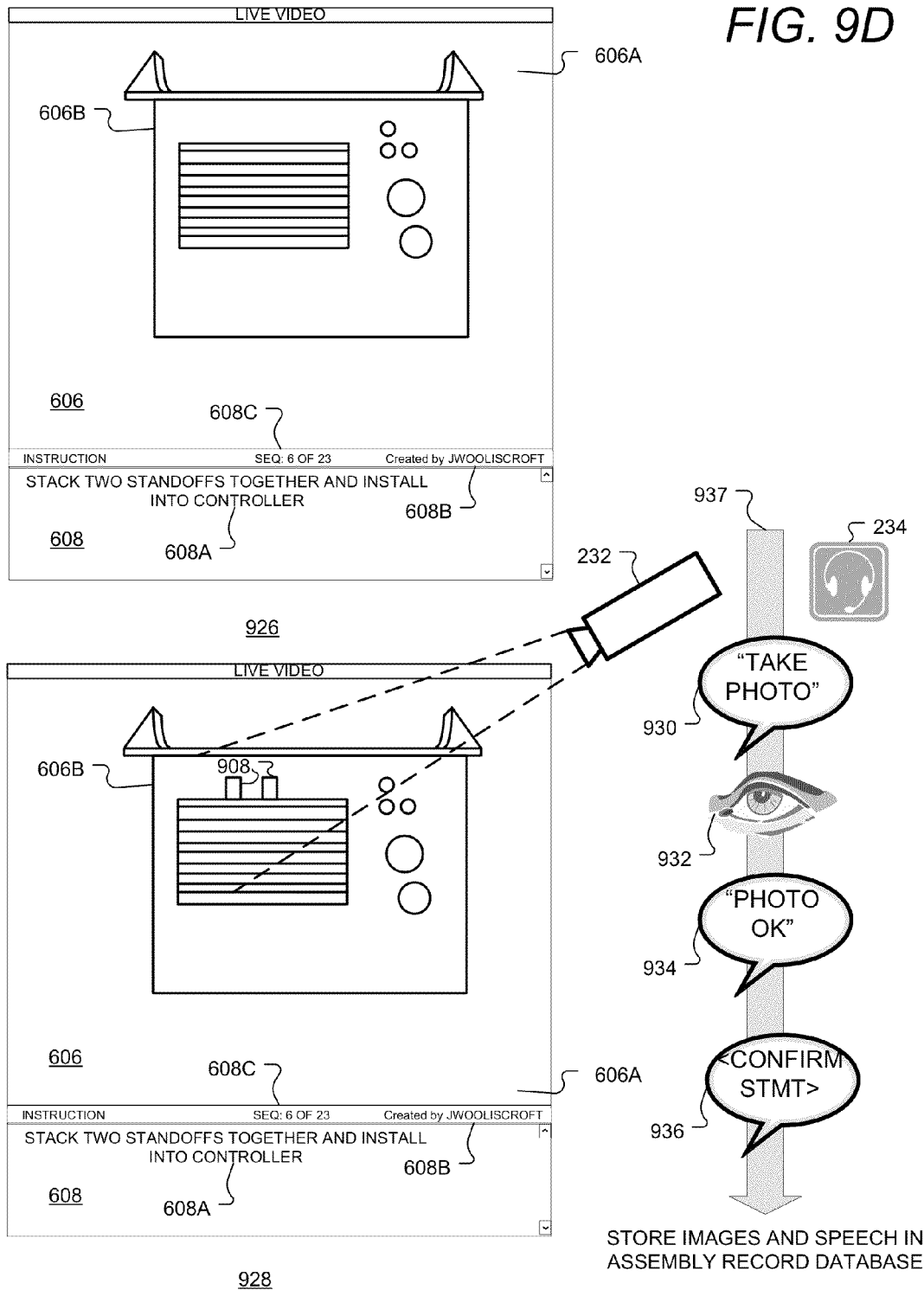
FIG. 9D schematically illustrates using an image capture device and a headset with the computer-implemented user interface for verifying completion of one or more assembly instructions in accordance with some embodiments.

In another embodiment, FIG. 9D schematically illustrates using an image capture device and a headset with the computer-implemented user interface for verifying completion of one or more assembly instructions. In user interface excerpt 926, the assembler has placed component 606B on workbench surface 606A which is under a camera or other image capture device (not shown) and displayed in the user interface "live" or in real-time as a video or sequence of images. As previously described, component 606B may also be referred to as the in-use component since it is the component in-use by the assembler when performing the assembly instructions.

In this embodiment, the assembler follows assembly instructions 608A and attaches two standoffs 908 together and into a controller as illustrated in user interface excerpt 928 shown in FIG. 9D. The assembler may also refer to preassembled view area 612 shown in FIG. 6A for exemplary images and/or videos of a previously assembled component to assist in the assembly operation. To verify completion of the assembly instructions, the assembler positions an image capture device, such as third camera 232, to point at the portion of component 606B being assembled. In some embodiments, the image capture device is a relatively small and lightweight camera that the assembler holds and points at various portions of the component where the assembly is taking place. Typically, the image capture device is capable of capturing either video or single images and can be connected to the workstation either wirelessly or through a wired connection. Having a handheld image capture device is particular advantageous when component 606B consists of a larger essentially three-dimensional framework and the area of interest being worked upon is in the interior portion within the framework. The assembler can readily place the lightweight image capture device inside component 606B thereby pointing at the assembly area being worked upon while also capturing images.

With image capture device in position, the assembler starts voice verification sequence 938 by communicating various commands through headset 234. This causes the workstation to create a corresponding record of images and corresponding voice commands in the assembly record database. Accordingly, in one embodiment, a command such as "TAKE PHOTO" 930 is received, in English or the equivalent in the respective language of the assembler, which is interpreted by the speech recognition software on the workstation as the command to take an image or video using the image capture device. Before storing the images in the assembler record database, the resulting image or images are displayed on the user interface for visual inspection 932 by the assembler. If the images taken are accurate and the assembly correct, the assembler speaks a command accepting the images. The command "PHOTO OK" 934, in English or equivalent in another language, is processed by the speech recognition software on the workstation causing the workstation to then store the images in the assembly record database along with the voice commands, date and time, serial numbers for the component and/or other data related to the assembly. Voice verification sequence 937 may further request the assembler to provide an additional confirmation statement 936 as further confirmation that the assembler is both concentrating on the assembly instructions and paying close attention to the overall assembly process. In one embodiment, the confirmation statement 936 may require the assembler to recite the assembly instruction 608A being performed (e.g., "STACK TWO STANDOFFS TOGETHER AND INSTALL INTO CONTROLLER") or possibly a random phrase generated for each instruction.

Figure 9E:
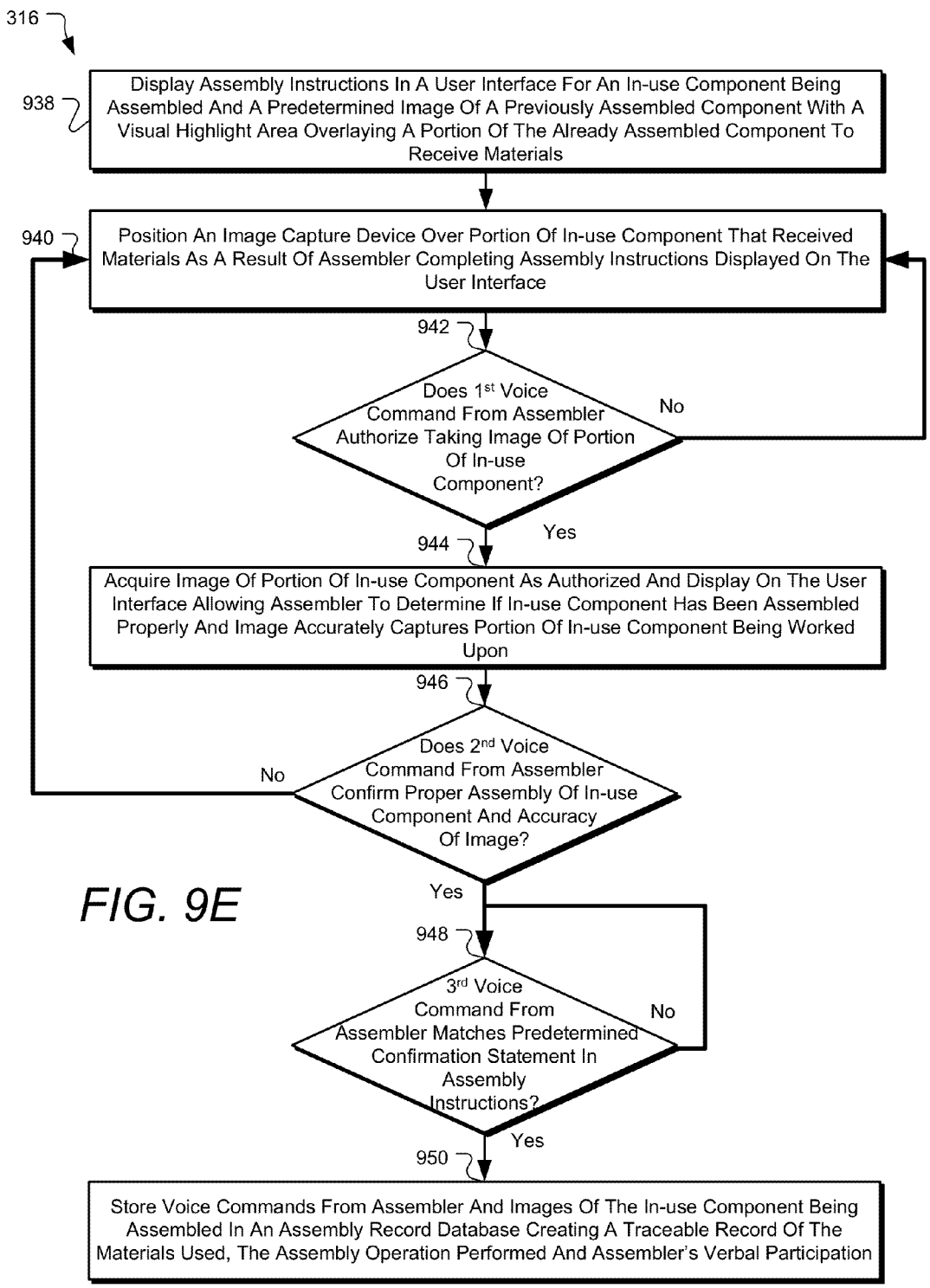
FIG. 9E is a flowchart diagram of exemplary operations for using an image capture device and headset to verify the completion of a sequence of one or more assembly instructions in accordance with some embodiments.

FIG. 9E is a flowchart diagram of exemplary operations for using the image capture device and headset to verify the completion of a sequence of one or more assembly instructions in accordance with some embodiments. This voice and image verification approach illustrated in FIG. 9D and described below can be used for verification of assembly instructions as described in reference to final assembled product 316 shown in FIG. 3. In this embodiment, the user interface displays assembly instructions for an in-use component being assembled and a predetermined image of a previously assembled component. If it is helpful, in some embodiments, a visual highlight area is displayed that overlays a portion of the previously assembled component to receive materials through the assembly instructions (938). Assembly instructions 608A in some embodiments may appear as illustrated in user interface excerpt 928 shown in FIG. 9D. Similarly, previously assembled components 612A-E may appear in the user interface as illustrated in preassembled view area 612 in shown FIG. 6 with exemplary rectangular highlight 612I shown with matrix tray 612A. Once the assembler has completed the assembly instructions, the image capture device is positioned over a portion of the in-use component that received materials (940). In some embodiments, the assembler positions the image capture device with his hand to visually "point" to the area where the assembly instructions were performed and the operation completed. Alternatively, the workstation may use image processing and recognition techniques to electromechanically and/or optically position the image capture device and focus on the area of the component where the assembly instructions have been performed.

Once the image capture device is in place, in some embodiments, a first voice command from the assembler is processed to determine if acquisition of an image from the image capture device positioned over the portion of in-use component has been authorized (942). If the assembler does not speak a 1st voice command authorizing acquiring the image (942—No), the image capture device may be repositioned causing a new image to be displayed on the user interface for inspection and consideration by the assembler.

If the assembler wants to accept this new image, a 1st voice command from the assembler is received authorizing acquisition of the new image (944). For example, the assembler may speak a voice command in English or a language of choice with a phrase equivalent to "TAKE PHOTO". By providing this command, the assembler approves the image as accurately capturing the portion of the in-use component and allows the assembler to further determine if the in-use component has been assembled properly.

Next, the assembler may take a few moments to determine if the component has been assembled properly as depicted in the acquired image. Under some circumstances, the assembler may recognize that the assembly instructions were not performed properly (and need to be redone) or that the image acquired needs to be taken again (946—No). When this occurs, the assembler may reposition the image capture device (940) and once again speak the command "TAKE PHOTO" or equivalent to acquire a different image. Alternatively, if the assembler wants to confirm the acquired image, a second voice command from the assembler is processed confirming accuracy of the image acquired and that in-use component has been properly assembled (946—Yes). For example, the assembler may speak a voice command in English or a language of choice with a phrase equivalent to "PHOTO OK". By providing this command, the assembler is indicating that the image is accurate and the assembly instructions performed on the component in the image have been done correctly.

In some embodiments, the assembler is required to provide an additional confirmation statement by providing a 3rd voice command matching a predetermined confirmation statement in the assembly instructions (948). In one embodiment, the 3rd voice command requires the assembler to read a predetermined confirmation statement presented on the user interface. For example, the confirmation statement may include reciting the assembly instruction 608A being performed (e.g., "STACK TWO STANDOFFS TOGETHER AND INSTALL INTO CONTROLLER") or possibly a random phrase generated for each instruction. In response to receiving this command, the third voice command is stored in the assembly record database along with other data, wherein a match between the third voice command and the predetermined confirmation statement provides an indicia of the assembler's attention when assembling the manufactured product (950). As previously described, the images, voice commands, dates, component serial numbers, and the like all help create a traceable record of the materials used, the assembly operation performed and assembler's verbal participation when performing the assembly instructions.

While examples and implementations have been described, they should not serve to limit any aspect of the present invention. Accordingly, implementations of the invention can be implemented in digital electronic circuitry, or in computer hardware, firmware, software, or in combinations of them. Apparatus of the invention can be implemented in a computer program product tangibly embodied in a machine readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high level procedural or object oriented programming language, or in assembly or machine language if desired; and in any case, the language can be a compiled or interpreted language. Suitable processors include, by way of example, both general and special purpose microprocessors. Generally, a processor will receive instructions and data from a read only memory and/or a random access memory. Generally, a computer will include one or more mass storage devices for storing data files; such devices include magnetic disks, such as internal hard disks and removable disks; magneto optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto optical disks; and CD ROM disks. Any of the foregoing can be supplemented by, or incorporated in, ASICs.

While specific embodiments have been described herein for purposes of illustration, various modifications may be made without departing from the spirit and scope of the invention. Accordingly, the invention is not limited to the above-described implementations, but instead is defined by the appended claims in light of their full scope of equivalents.

What is claimed is:

1. A computer-implemented method of verifying the completion of a sequence of one or more assembly instructions used when assembling a manufactured product, the method comprising:

displaying assembly instructions for an in-use component being assembled in a user interface in addition to a predetermined image of a previously assembled component with a visual highlight area that overlays a portion of the previously assembled component that received materials through the assembly instructions, wherein the assembly instructions relate the visual highlight area from the previously assembled component with a portion of the in-use component being assembled;

positioning an image capture device over the portion of an in-use component that received materials as a result of an assembler completing one or more assembly instructions displayed on the user interface;

processing a first voice command from the assembler authorizing acquisition of an image from the image capture device positioned over the portion of the in-use component;

processing a second voice command from the assembler confirming accuracy between the visual highlight area from the predetermined image of the previously assembled component with the image acquired and that the in-use component has been properly assembled; and storing the first and second voice commands from the assembler and images of the in-use component being assembled in an assembly record database creating a traceable record of the materials used, the assembly operation performed, and an assembler's verbal participation.

2. The method of claim 1 wherein the assembler performs assembly instructions with the component placed on an assembly workstation.

3. The method of claim 1 wherein the assembler performs assembly instructions with the component located adjacent to the assembly workstation.

4. The method of claim 1 wherein the materials associated with the manufactured product are extracted directly from a Bill of Materials in an enterprise database system.

5. The method of claim 1 wherein processing a first voice command comprises:
displaying the image acquired on the user interface allowing the assembler to determine if the in-use component appears to have been assembled properly and if the image accurately captures the portion of in-use component.

6. The method of claim 1 wherein the first voice command includes the phrase, "Take photo".

7. The method of claim 1 wherein the second voice command includes the phrase, "Photo ok".

8. The method of claim 1 further comprising:
processing a third voice command resulting from requiring the assembler to read a predetermined confirmation statement presented on the user interface and storing the third voice command in the assembly record database with other voice commands, wherein a match between the third voice command and the predetermined confirmation statement provides an indicia of the assembler's attention when assembling the manufactured product.

9. The method of claim 8 wherein the predetermined confirmation statement corresponds to at least one assembly instruction selected from the sequence of one or more assembly instructions.

10. The method of claim 8 wherein the predetermined confirmation statement is a randomly generated phrase.

11. A computer program product for verifying the completion of a sequence of one or more assembly instructions used when assembling a manufactured product, tangibly stored on a non-transitory computer readable medium, comprising instructions operable to cause a programmable processor to:

display assembly instructions for an in-use component being assembled in a user interface in addition to a predetermined image of a previously assembled component with a visual highlight area that overlays a portion of the previously assembled component that received materials through the assembly instructions, wherein the assembly instructions relate the visual highlight area from the previously assembled component with a portion of the in-use component being assembled;

position an image capture device over the portion of an in-use component that received materials as a result of an assembler completing one or more assembly instructions displayed on the user interface;

process a first voice command from the assembler authorizing acquisition of an image from the image capture device positioned over the portion of the in-use component;

process a second voice command from the assembler confirming accuracy between the visual highlight area from the predetermined image of the previously assembled component with the image acquired and that the in-use component has been properly assembled; and store the first and second voice commands from the assembler and images of the in-use component being assembled in an assembly record database creating a traceable record of the materials used, the assembly operation performed, and an assembler's verbal participation.

12. The computer program product of claim 11, further comprising instructions, when executed, process a third voice command resulting from requiring the assembler to read a predetermined confirmation statement presented on the user interface and storing the third voice command in the assembly record database with other voice commands, wherein a match between the third voice command and the predetermined confirmation statement provides an indicia of the assembler's attention when assembling the manufactured product.

13. An apparatus for verifying the completion of a sequence of one or more assembly instructions used when assembling a manufactured product, the apparatus comprising:
a processor capable of executing instructions; and
a memory holding instructions that when executed by the processor cause the processor to:

display assembly instructions for an in-use component being assembled in a user interface in addition to a predetermined image of a previously assembled component with a visual highlight area that overlays a portion of the previously assembled component that received materials through the assembly instructions, wherein the assembly instructions relate the visual highlight area from the previously assembled component with a portion of the in-use component being assembled;

position an image capture device over a portion of an in-use component that received materials as a result of an assembler completing one or more assembly instructions displayed on a user interface;

process a first voice command from the assembler authorizing acquisition of an image from the image capture device positioned over the portion of the in-use component;

process a second voice command from the assembler confirming accuracy between the visual highlight area from the predetermined image of the previously assembled component with the image acquired and that the in-use component has been properly assembled; and store the first and second voice commands from the assembler and images of the in-use component being assembled in an assembly record database creating a traceable record of the materials used, the assembly operation performed, and an assembler's verbal participation.

14. The apparatus of claim 13, further comprising instructions, when executed, that, process a third voice command resulting from requiring the assembler to read a predetermined confirmation statement presented on the user interface and storing the third voice command in the assembly record database with other voice commands, wherein a match between the third voice command and the predetermined confirmation statement provides an indicia of the assembler's attention when assembling the manufactured product.

* * * * *